United States Patent
Dumas et al.

(10) Patent No.: US 12,529,071 B2
(45) Date of Patent: Jan. 20, 2026

(54) SELECTION MARKER-COMPRISING CELL LINE AND USES THEREOF FOR PROTEIN PRODUCTION

(71) Applicant: Sanofi, Paris (FR)

(72) Inventors: Bruno Louis Dumas, Paris (FR); Mohammed Nabil Lounis, Paris (FR)

(73) Assignee: Sanofi, Paris (FR)

( * ) Notice: Subject to any disclaimer, the term of this patent is extended or adjusted under 35 U.S.C. 154(b) by 1069 days.

(21) Appl. No.: 17/440,728

(22) PCT Filed: Mar. 19, 2020

(86) PCT No.: PCT/EP2020/057583
§ 371 (c)(1),
(2) Date: Sep. 17, 2021

(87) PCT Pub. No.: WO2020/188021
PCT Pub. Date: Sep. 24, 2020

(65) Prior Publication Data
US 2022/0177909 A1    Jun. 9, 2022

(30) Foreign Application Priority Data
Mar. 19, 2019   (EP) .................................... 19305331

(51) Int. Cl.
*C12N 15/85* (2006.01)
*C12N 9/02* (2006.01)

(52) U.S. Cl.
CPC ............. *C12N 15/85* (2013.01); *C12N 9/001* (2013.01); *C12Y 103/05002* (2013.01)

(58) Field of Classification Search
CPC ........ C12Y 103/05002; C12N 2310/20; C12N 15/907; C12N 15/85
See application file for complete search history.

(56) References Cited

U.S. PATENT DOCUMENTS

| | | | |
|---|---|---|---|
| 8,232,377 B2 | 7/2012 | Chiba et al. | |
| 2017/0335292 A1* | 11/2017 | Dumas | ........... C12Y 103/05002 |
| 2022/0016106 A1 | 1/2022 | Sykes et al. | |

FOREIGN PATENT DOCUMENTS

| | | |
|---|---|---|
| CN | 109777837 A | 5/2019 |
| CN | 116457468 A | 7/2023 |
| RU | 2556816 C1 | 7/2015 |
| WO | 2007132949 A1 | 11/2007 |
| WO | 2012027533 A1 | 3/2012 |
| WO | 2016/062837 A1 | 4/2016 |
| WO | WO-2017117006 A1 * | 7/2017 ........... A61K 31/519 |

OTHER PUBLICATIONS

Fischer S, Handrick R, Otte K. The art of CHO cell engineering: A comprehensive retrospect and future perspectives. Biotechnol Adv. Dec. 2015;33(8):1878-96. doi: 10.1016/j.biotechadv.2015.10.015. Epub Oct. 31, 2015. PMID: 26523782. (Year: 2015).*
Mouse Genome Informatics: Dhodh tm1e(EUCOMM)Wtsi, Targeted Allele Detail MGI Mouse, Jun. 11, 2019, http://www.informatics.jax.org/allele/MGI:4842751 [Retrieved on Jun. 18, 2019].
Mouse Genome Informatics: Dhodh tm1b(EUCOMM)Wtsi, Targeted Allele Detail MGI Mouse, Jun. 11, 2019, http://www.informatics.jax.org/allele/MGI:5548703 [Retrieved on Feb. 18, 2019].
Van Der Weyden et al., "Genome-wide in vivo screen identifies novel host regulators of metastatic colonization," Nature (2017) 541(7636):233 (including supplemental data).
Yamazaki et al., "Genetic transformation of a Rhizomucor pusillus mutant defective in asparagine-linked glycosylation: production of a milk-clotting enzyme in a less-glycosylated form," Applied Microbiology and Biotechnology (1999) 52(3):401-9.
Extended European Search Report dated Jul. 19, 2019 for EP Application No. 19305331.1.
Sykes, "The emergence of dihydroorotate dehydrogenase (DHODH) as a therapeutic target in acute myeloid leukemia," Expert Opin Ther Targets. (2018) 22(11):893-98.
Ullrich et al., "Plant dihydroorotate dehydrogenase differs significantly in substrate specificity and inhibition from the animal enzymes," FEBS Lett. (2002) 529(2-3):346-50.
Zeng et al., "Targeting dihydroorotate dehydrogenase in acute myeloid leukemia," Haematologica (2018) 103(9):1415-17.
Bajzikova et al., "Reactivation of Dihydroorotate Dehydrogenase-Driven Pyrimidine Biosynthesis Restores Tumor Growth of Respiration-Deficient Cancer Cells," Cell Metab. (2019) 29(2):399-416.

* cited by examiner

*Primary Examiner* — Fereydoun G Sajjadi
*Assistant Examiner* — Qinhua Gu
(74) *Attorney, Agent, or Firm* — Steptoe LLP; Z. Ying Li; Carolyn Breckel

(57) ABSTRACT

The present invention concerns a cell line comprising an endogenous dihydroorotate dehydrogenase (DHODH) gene which is partially or fully inactivated, and its use for producing recombinant proteins.

23 Claims, 8 Drawing Sheets
Specification includes a Sequence Listing.

SELECTION MARKER-COMPRISING CELL LINE AND USES THEREOF FOR PROTEIN PRODUCTION

CROSS-REFERENCE TO RELATED APPLICATIONS

The present application is a national stage application under 35 U.S.C. § 371 of International Patent Application No. PCT/EP2020/057583, filed Mar. 19, 2020, which claims priority to EP Patent Application No. 19/305331.1, filed Mar. 19, 2019. The contents of the aforementioned priority applications are incorporated herein by reference in their entirety.

FIELD OF THE INVENTION

The present invention concerns cell lines and selection markers for protein production.

BACKGROUND OF THE INVENTION

Producing recombinant proteins on an industrial scale requires isolation of clones producing high amounts of recombinant proteins. Introducing heterologous genes into animal host cells and screening for expression of the added genes is a lengthy and complicated process. The process involves the transfection and the selection of clones with stable long-term expression, and the screening for clones having high expression rates for the corresponding recombinant protein.

When generating clones expressing a recombinant protein from expression vectors, host cells are usually transfected with a DNA vector encoding both the protein of interest and the selection marker on the same vector. Such an expression vector thus comprises a selectable marker allowing the selection of clones in which the expression vector is present. Such a selectable marker may also lead to a co-amplification of transfected DNA, thereby allowing the isolation of high-producer clones.

Most selectable markers are either a protein conferring resistance to an antibiotic or other toxic substance or a protein essential to cell survival. Several such selectable markers are known in the art, including e.g. G418, hygromycin, puromycin, zeomycin, dihydrofolate reductase (DHFR), glutamine synthetase (GS) and hypoxanthine-guanine phosphoribosyltransferase (HPRT). In particular, GS is widely used as a selectable marker in the field of industrial recombinant protein production in eukaryotic cells. The GS gene permits the synthesis of glutamine, essential for cell growth, and is inhibited by MSX (L-methionine sulfoximine). In the presence of MSX, only cells expressing higher amount of GS do survive. After appropriate screening it is possible to select cells producing the exogenous proteins.

In previous application WO2016/062837, the inventors developed an expression system based on the use of dihydroorotate dehydrogenase (DHODH) as a selectable marker. DHODH is an enzyme required for pyrimidine synthesis. Compounds which inhibit DHODH therefore inhibit DNA synthesis and hence cell proliferation. This selection marker thus comprises an expression vector encoding DHODH used in combination with a DHODH inhibitor such as leflunomide and teriflunomide.

However, most of the inhibitors used with the above selection markers are toxic. In the case of the DHODH selection marker, teriflunomide is for example a potent immune-suppressor and its handling especially at large scale can be challenging for safety reasons. In the case of the GS selection marker, MSX is a convulsant at high doses and may thus also raise handling issues. In the case of DHFR selection marker, methotrexate is known for displaying hematopoietic and digestive toxicities, thereby also raising handling issues.

Accordingly, there is a need for expression systems where the selection of the protein of interest-producing clone can be performed without addition of difficult to handle compound.

The present invention meets this need.

SUMMARY OF THE INVENTION

The present invention arises from the design by the inventors of a cell line wherein protein of interest-producing cells can be selected in a medium devoid of uridine, thanks to the partial or full inactivation of the DHODH gene in said cell line. This cell line, wherein the DHODH gene is partially or fully inactivated, is typically grown in a medium supplemented with uridine, but, when transfected with an expression vector comprising a nucleotide sequence encoding a mammalian DHODH, in particular encoding a mutated mammalian DHODH, and an expression cassette for expressing a protein of interest, the culture medium is typically changed by a culture medium devoid of uridine, thereby selecting the protein of interest-producing cells.

Such an expression system is particularly advantageous because, by avoiding the use of inhibitors as selection pressure, it increases the viability of the producing cells. The inventors further demonstrated that this decrease in toxicity was associated with a high productivity.

The present invention thus concerns a cell line comprising an endogenous dihydroorotate dehydrogenase (DHODH) gene which is partially or fully inactivated.

In a particular embodiment, said cell line is a Chinese Hamster Ovary (CHO) cell line.

In a more particular embodiment, the cell line is produced by
a) inactivating the endogenous DHODH gene in a cell, in particular by a gene editing method, such as by a CRISPR-Cas9 method, and
b) culturing the cell in a culture medium comprising uridine under conditions suitable for generating a cell line in which the endogenous DHODH gene is partially or fully inactivated.

In a particular embodiment, all the alleles of the endogenous DHODH gene of said cell line are partially or fully inactivated.

In a further embodiment, said cell line further comprises an expression vector comprising a nucleotide sequence encoding an exogenous mammalian DHODH and at least one expression cassette for expressing recombinant protein, wherein said exogenous DHODH comprises a sequence at least 60% identical to the sequence SEQ ID NO: 2 or to the sequence SEQ ID NO: 4.

In a particular embodiment thereof, said nucleotide sequence comprises the sequence of SEQ ID NO: 1 or the sequence of SEQ ID NO: 3.

In another particular embodiment thereof, said recombinant protein is a monoclonal antibody.

In still another particular embodiment thereof, said vector comprises a first expression cassette suitable for cloning of an antibody light chain, and a second expression cassette suitable for cloning of an antibody heavy chain.

Another object of the invention is an expression system comprising:

(i) the cell line comprising an endogenous dihydroorotate dehydrogenase (DHODH) gene which is partially or fully inactivated as defined above, and (ii) an expression vector comprising a nucleotide sequence encoding an exogenous mammalian DHODH and at least one expression cassette for expressing a recombinant protein, wherein said exogenous DHODH comprises a sequence at least 60% identical to the sequence SEQ ID NO: 2 or to the sequence SEQ ID NO: 4.

In a particular embodiment, said nucleotide sequence comprises the sequence of SEQ ID NO: 1 or the sequence of SEQ ID NO: 3.

In another particular embodiment, said recombinant protein is a monoclonal antibody.

In still a particular embodiment, said vector comprises a first expression cassette suitable for cloning of an antibody light chain, and a second expression cassette suitable for cloning of an antibody heavy chain.

The present invention further concerns (i) the cell line as defined above, or the expression system as defined above, and (ii) a culture medium devoid of uridine.

Another object of the invention relates to an in vitro method of producing a recombinant protein comprising the steps of:

A) a1) providing a cell line as defined above further comprising an expression vector comprising a nucleotide sequence encoding an exogenous mammalian DHODH and at least one expression cassette for expressing recombinant protein, wherein said exogenous DHODH comprises a sequence at least 60% identical to the sequence SEQ ID NO: 2 or to the sequence SEQ ID NO: 4;
or
a2) providing a cell line as defined above, and
a2') introducing an expression vector as defined above into the cell line provided in step a2);
or
a3) providing a cell line comprising an endogenous DHODH gene,
a3') partially or fully inactivating the endogenous DHODH gene in the cell line provided in step a3), and
a3") introducing an expression vector as defined above into the cell line comprising a partially or fully inactivated endogenous DHODH gene obtained in step a3');

B) culturing said cell line under conditions suitable for production of the recombinant protein; and C) isolating and/or purifying said recombinant protein.

In a particular embodiment, step B) of said method is conducted in a culture medium devoid of uridine.

In another particular embodiment, said method further comprises a step D) of formulating said recombinant protein into a pharmaceutical composition.

The present invention further concerns the use of a cell line as defined above, an expression system as defined above or a kit as defined above for producing a recombinant protein.

In a particular embodiment, the cell line, the expression system or the kit is used in combination with a culture medium devoid of uridine.

DETAILED DESCRIPTION OF THE INVENTION

Dihydroorotate Dehydrogenase

Figure 1:
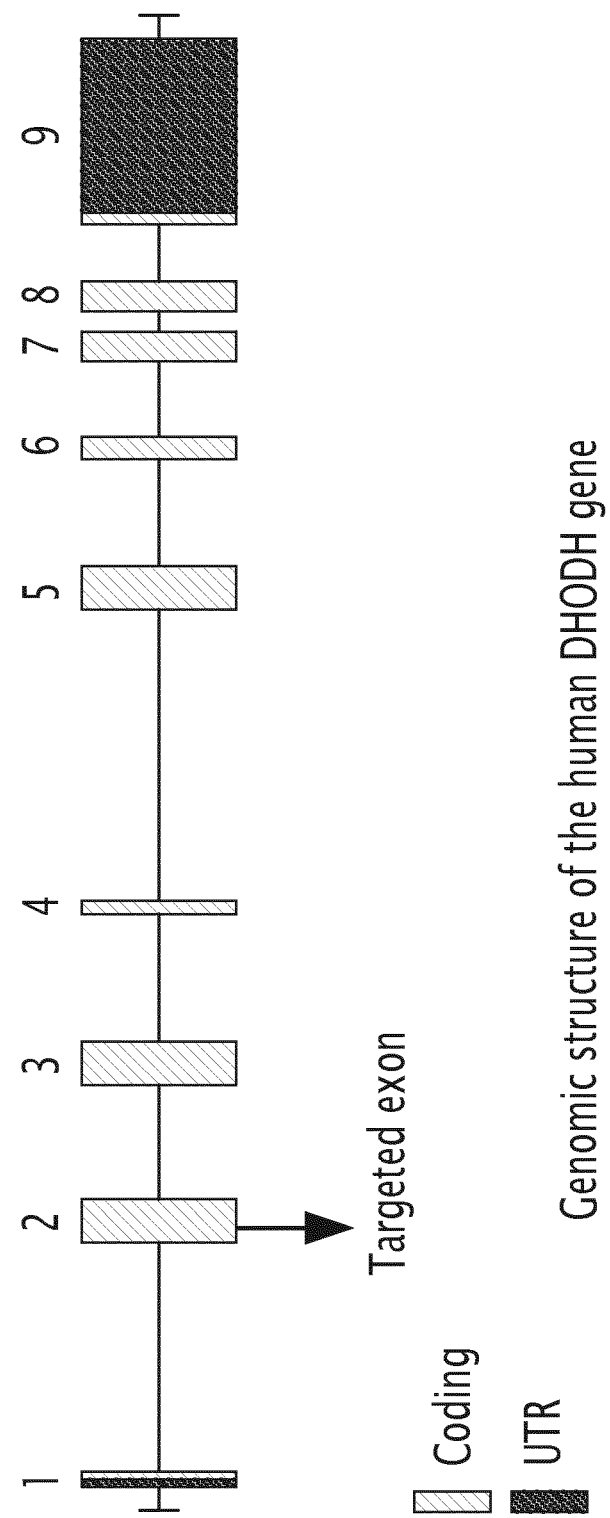
FIG. 1 shows the genomic structure of the human DHODH gene referenced under the Gene ID: 100756632 available on 21 Dec. 2018 on Genbank NCBI.

As used herein, the term "dihydroorotate dehydrogenase" or "DHODH" refers to a polypeptide capable of catalyzing the conversion of dihydroorotate (4,5-dihydroorotic acid or 2,6-dioxo-1,3-diazinane-4-carboxylic acid) to orotate (orotic acid or 1,2,3,6-tetrahydro-2,6-dioxo-4-pyrimidinecarboxylic acid), as represented by the following reaction:

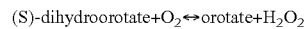

(S)-dihydroorotate+$O_2$↔orotate+$H_2O_2$

Such a polypeptide is classified under Enzyme Commission (EC) number 1.3.3.1. Polypeptides capable of catalyzing the above reaction exhibit "DHODH activity".

The above reaction is the fourth step in the de novo synthesis of uridine monophosphate (rUMP) required for the synthesis of DNA and RNA. Inhibition or inactivation of DHODH thus has the effect of inhibiting DNA and RNA synthesis and hence inhibits cell proliferation.

Cell Line

The present invention concerns a cell line comprising an endogenous dihydroorotate dehydrogenase (DHODH) gene which is partially or fully inactivated.

The cell line is a eukaryotic cell line, e.g. a mammalian cell line such as a Chinese Hamster Ovary (CHO) cell line, a monkey cell line or a human cell line.

In a particular embodiment, the cell line is a CHO cell line.

CHO cell lines are commonly used for industrial protein production, and many CHO cell lines are known to those skilled in the art. For instance, such CHO cell lines include strains which are publicly available from the American Type Culture Collection such as the CHO-K1 cell line (ATCC Number: CCL-61), the CHO-S cell line (marketed for instance by Invitrogen and Gibco), the CHO DP-12 cell line (ATCC Nos. CRL-12444 and 12445) and the CHO 1-15 cell line (ATCC Number CRL-9606). Another cell line suitable for industrial protein production is the CHO 9E4 cell line. The 9E4 cell line was established from a clone of the CHO-K1 cell line through a single cell cloning process. The establishment of the 9E4 cell line is presented more deeply in Example 1. The CHO-K1 cell line was obtained by Puck in 1957 and has been deposited at the ATCC under number CCL-61.

Human cells such as HEK293 (ATCC Number CRL-1573), HKB11 (ATCC Number CRL-12568), PER-C6 (Crucell), HT1080 (ATCC Number CRL-121), Jurkat, Daudi, Raji and CAP (ATCC Number CRL-1098) cells may also be used for protein production, in order to obtain a native glycosylation pattern for recombinant human proteins.

In one embodiment, the cell line is capable of growing in serum-free medium (e.g. a chemically-defined medium) and/or in suspension. Such a cell line can easily be obtained by those skilled in the art by adapting the parent cell line to grow in serum-free medium and/or in suspension (e.g. through single cell cloning, through progressive adaptation and/or through a "starve and save" process).

The cell line of the present invention is a cell line comprising an endogenous dihydroorotate dehydrogenase (DHODH) gene which is partially or fully inactivated.

By "endogenous DHODH gene" is meant herein a DHODH gene normally present in said particular cell at a particular developmental stage under particular environmental conditions.

The "endogenous DHODH gene" distinguishes from the "exogenous DHODH" defined below, in that said exogenous DHODH is provided by the expression vector defined below, which may be present in the cell line of the invention if said expression vector has been introduced in said cell line.

As will be understood from the skilled person, the endogenous DHODH gene will depend on the cell line. For example, in a CHO cell line, the endogenous DHODH gene is a Chinese hamster DHODH gene; in a human cell line, the endogenous DHODH gene is a human DHODH gene.

Typically, a wild-type Chinese hamster DHODH refers to a sequence comprising or consisting of SEQ ID NO: 2, as well as variants thereof exhibiting DHODH activity. Such variants may for example correspond to variants that occur naturally in hamster species (such as allelic variants or splice variants).

Typically, a wild-type human DHODH refers to a sequence comprising or consisting of SEQ ID NO: 4, as well as variants thereof exhibiting DHODH activity. Such variants may for example correspond to variants that occur naturally in human species (such as allelic variants or splice variants).

As used herein, a "gene" includes a DNA region encoding a gene product, as well as all DNA regions which regulate the production of the gene product, whether or not such regulatory sequences are adjacent to coding and/or transcribed sequences. Accordingly, a gene includes promoter sequences, terminators, translational regulatory sequences such as ribosome binding sites and internal ribosome entry sites, enhancers, silencers, insulators, boundary elements, replication origins, matrix attachment sites and locus control regions.

Gene "inactivation" refers to any reduction in gene expression as compared to the corresponding wild-type cell. Gene inactivation may be complete (full inactivation or knock-out) or partial (e.g. a hypomorph in which a gene exhibits less than normal expression levels or a product of a mutant gene that shows partial reduction in the activity it influences).

In a particular embodiment, all the alleles of the endogenous DHODH gene are partially or fully inactivated.

In a particular embodiment, said endogenous DHODH gene is fully inactivated.

In a more particular embodiment, all the alleles of the endogenous DHODH gene are fully inactivated.

In a particular embodiment, the endogenous DHODH gene is inactivated using the CRISPR-Cas9 method, as described in Aga et al. (2015) *BMC Proceedings* 9 (suppl 9):P2.

As well-known from the skilled person, CRISPR-Cas9 system is a prokaryotic adaptive immune response system that uses noncoding RNAs to guide the Cas9 nuclease to induce site-specific DNA cleavage. This DNA damage is repaired by cellular DNA repair mechanisms, either via the non-homologous end joining DNA repair pathway (NHEJ) or the homology-directed repair (HDR) pathway. To create gene disruptions, a single guide RNA (gRNA), consisting of a crRNA sequence that is specific to the DNA target, and a tracrRNA sequence that interacts with the Cas9 protein, binds to a recombinant form of Cas9 protein that has DNA endonuclease activity. The resulting complex will cause target-specific double-stranded DNA cleavage. The cleavage site will be repaired by the nonhomologous end joining (NHEJ) DNA repair pathway, an error-prone process that may result in insertions/deletions (INDELs) that may disrupt gene function.

In a particular embodiment, at least one exon of the DHODH gene is targeted for inactivation, in particular by a gene editing method, such as a CRISPR-Cas9 method. In a more particular embodiment, the part of the DHODH gene encoding the N-terminal part of the DHODH protein is targeted for inactivation, in particular by a gene editing method, such as a CRISPR-Cas9 method. In still another embodiment, the second exon of the DHODH gene is targeted for inactivation, in particular by a gene editing method, such as a CRISPR-Cas9 method.

In one embodiment, a 20-nucleotide sequence of sequence CAAGGATGATGGCTGCATCC (SEQ ID NO: 23) or of sequence GGATGCAGCCATCATCCTTG (SEQ ID NO: 5) or any sequence compatible with the knocking out of DHODH gene without impairing the CHO survival, is used as the corresponding piece of DNA for generating gRNA, which targets the second exon of the DHODH gene. This gRNA is typically obtained using the oligonucleotides of sequence CACCGCACCGGGATGCAGCCATCATCCTTG (SEQ ID NO: 6) and AAAACCAAGGATGATGGCTGCATCC (SEQ ID NO: 7) or using the oligonucleotides of sequence GGATGCAGCCATCATCCTTGGTTTT (SEQ ID NO: 24) and CAAGGATGATGGCTGCATCCCGGTG (SEQ ID NO: 25), typically cloned at a unique restriction site of a plasmid, such as the BaeI site of the pCM3561 plasmid (commercialized by Invitrogen), so that the cloned DNA sequence is under the control of the U6 promoter and, once said plasmid is introduced into the cell, is transcribed into a single transcription unit containing a crRNA fused to tracrRNA, the crRNA part being specific of the second exon of the DHODH gene and the tracrRNA part being recognized by the Cas9 enzyme.

In order to identify a cell line inactivated, for the DHODH gene, single cells are typically isolated by limiting dilution in well plates, and, after reaching appropriate confluence, for example 90% confluence, the cells are split into at least 2 conditions, such as one in a culture medium supplemented with uridine and another in a culture medium devoid of uridine. Clones of interest are typically the clones sensitive to the lack of uridine.

Once isolated, these cells of interest can be cultured in a culture medium comprising a pyrimidine base, in particular a culture medium comprising uridine.

By "pyrimidine base" is meant herein pyrimidine per se and various pyrimidine derivatives having a pyrimidine nucleus as a skeleton. Examples of such pyrimidine bases include uracil nucleic acid-related substances, such as uracil, uridine, uridine phosphates, in particular uridine monophosphate (UMP), uridine diphosphate (UDP) and uridine triphosphate (UTP), deoxyuridine, deoxyuridine phosphates, in particular deoxyuridine monophosphate (dUMP), deoxyuridine diphosphate (dUDP) and deoxyuridine triphosphate (dUTP); cytosine nucleic acid-related substances, such as cytosine, cytidine, cytidine phosphates, in particular cytidine monophosphate (CMP), cytidine diphosphate (CDP), cytidine triphosphate (CTP), deoxycytidine, 2'-deoxycytidine, deoxycytidine phosphates, in particular deoxycytidine monophosphate (dCMP), deoxycytidine diphosphate (dCDP) and deoxycytidine triphosphate (dCTP); thymine, thymidine, thymidine phosphates in particular thymidine monophosphate (TMP) thymidine diphosphate (TDP) and thymidine triphosphate (TTP), deoxythymidine, deoxythymidine phosphates in particular deoxythymidine monophosphate (dTMP), deoxythymidine diphosphate (dTDP) and deoxythymidine triphosphate (dTTP) and orotate.

In a particular embodiment, said pyrimidine base is uridine.

By "uridine" is meant herein the nucleoside of the following formula

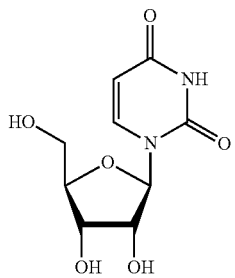

By "culture medium devoid of uridine" is meant any basal culture medium suitable for the growth of a particular cell line, wherein said medium comprises less than 1 mM of uridine, in particular said medium does not comprise any uridine.

By "culture medium comprising uridine" is meant any basal culture medium suitable for the growth of a particular cell line, wherein said medium further comprises from 1 mM and 25 mM of uridine, in particular from 5 mM to 10 mM of uridine.

By "basal culture medium" is meant herein an unsupplemented medium which is suitable for exposure to cells, for example to CHO cells. As will be understood by the skilled person, the basal culture medium to be used will depend of the type of cells used.

Examples of basal culture medium include CDCHO medium, OPTiCHO™ medium, Fecto CHO™ medium, FortiCHO™ medium, ExpiCHO™ medium, Ex-Cell™ medium, ActiPRO™ medium, MAM PF77™ medium and PowerCHO™ medium.

In a particular embodiment, the basal culture medium is further supplemented with glutamine, typically with 4 to 6 mM of glutamine.

Accordingly, in a particular embodiment, the cell line of the invention is produced by a) inactivating the endogenous DHODH gene in a cell, in particular by a gene editing method, such as a CRISPR-Cas9 method, and b) culturing the cell in a culture medium comprising uridine under conditions suitable for generating a cell line in which the endogenous DHODH gene is partially or fully inactivated.

The production of a CHO cell line comprising an endogenous DHODH gene which is fully or partially inactivated by a CRISPR-Cas9 approach, is more deeply exemplified in Examples 2 and 3.

The production of a cell line, such as a CHO cell line, comprising an endogenous DHODH gene which is fully or partially inactivated can be generated by a variety of other molecular biology techniques known in the art. For example, other gene editing techniques useful for generating a cell line having an endogenous DHODH gene which is fully or partially inactivated include use of zinc finger nucleases (ZFNs) or Transcription Factor-like Effector Nucleases (TALENs). A Cre/Lox method can also be used to knock-out one or more or all alleles of the DHODH gene.

In a particular embodiment, the cell line of the invention further comprises an expression vector as defined below in the section "Expression vector".

Said expression vector may be introduced into the cell line by any suitable technique well-known from the skilled person, such as by transfection, in particular by electroporation or chemical transfection, or transduction.

In a particular embodiment, said cell line of the invention may further comprise an additional expression vector comprising a selection marker different from the expression vector of the invention, typically an additional expression vector comprising a sequence encoding glutamine synthetase.

Exogenous DHODH

The DHODH encoded by the expression vector used in the present invention (further referred to as "exogenous DHODH") may comprise or consist of a sequence at least 60%, 62%, 65%, 70%, 75%, 80%, 85%, 90%, 91%; 92%; 93%, 94%, 95%, 95.5%, 96%, 96.5%, 97%, 97.5%, 98%, 98.5%, 99%, 99.5% or 100% identical to SEQ ID NO: 2 or SEQ ID NO: 4. It may also comprise or consist of a fragment of at least 100, 150, 200, 250, 300 or 350 consecutive amino acids of SEQ ID NO: 2 or SEQ ID NO: 4, provided the protein retains DHODH activity.

In some embodiments, the exogenous DHODH according to the invention comprises or consists of a sequence at least 60%, 62%, 65%, 70%, 75%, 80%, 85%, 90%, 91%; 92%; 93%, 94%, 95%, 95%, 95.5%, 96%, 96.5%, 97%, 97.5%, 98%, 98.5%, 99%, 99.5% or 100% identical both to the sequence of SEQ ID NO: 2 and to the sequence of SEQ ID NO: 4.

In some embodiments, the exogenous DHODH according to the invention is a human DHODH, i.e. a DHODH of human origin.

As used herein, the term "human DHODH" refers to a protein of sequence comprising or consisting of SEQ ID NO: 4, as well as variants thereof exhibiting DHODH activity. Such variants may for example correspond to variants that occur naturally in human species (such as allelic variants or splice variants). Alternatively, such variants may correspond to variants obtained by genetic engineering. In one embodiment, such variants only differ from the sequence of SEQ ID NO: 4 by the presence of at most 150, 140, 130, 120, 110, 100, 90, 80, 70, 60, 50, 40, 30, 25, 24, 23, 22, 21, 20, 19, 18, 17, 16, 15, 14, 13, 12, 11, 10, 9, 8, 7, 6, 5, 4, 3, 2 or 1 amino acid variations as compared to SEQ ID NO: 4 (said variations including substitutions, insertions and deletions). In a particular embodiment, said human DHODH is a variant comprising a G202A mutation compared to the wild-type sequence, typically a protein comprising or consisting of the amino acid sequence SEQ ID NO: 26.

In some embodiments, the exogenous DHODH is a hamster DHODH, i.e. a DHODH of hamster origin. The hamster DHODH may be, for example, Chinese hamster (*Cetulus griseus*) DHODH.

As used herein, the term "Chinese hamster DHODH" refers to a sequence comprising or consisting of SEQ ID NO: 2, as well as variants thereof exhibiting DHODH activity. Such variants may for example correspond to variants that occur naturally in hamster species (such as allelic variants or splice variants). Alternatively, such variants may correspond to variants obtained by genetic engineering. In one embodiment, such variants only differ from the sequence of SEQ ID NO: 2 by the presence of at most 150, 140, 130, 120, 110, 100, 90, 80, 70, 60, 50, 40, 30, 25, 24, 23, 22, 21, 20, 19, 18, 17, 16, 15, 14, 13, 12, 11, 10, 9, 8, 7, 6, 5, 4, 3, 2 or 1 amino acid variations as compared to SEQ ID NO: 2 (said variations including substitutions, insertions and deletions).

In another embodiment, the variant DHODH will have DHODH activity, optionally the same level of activity as the wild-type protein, or 50%, 60%, 70%, 80%, 90%, 100%, 110%, 120%, 130%, 140% or more of the level of activity as the wild-type protein.

By a polypeptide having an amino acid sequence at least, for example, 95% "identical" to a query amino acid sequence of the present invention, it is intended that the amino acid sequence of the subject polypeptide is identical to the query sequence except that the subject polypeptide sequence may include up to five amino acid alterations per each 100 amino acids of the query amino acid sequence. In other words, to obtain a polypeptide having an amino acid sequence at least 95% identical to a query amino acid sequence, up to 5% (5 of 100) of the amino acid residues in the subject sequence may be inserted, deleted, or substituted with another amino acid.

Sequence identity may be determined over the full length of the variant sequence, the full length of the reference sequence, or both. For example, the percentage of identity may be calculated using a global alignment (i.e. the two sequences are compared over their entire length). Methods for comparing the identity and homology of two or more sequences are well known in the art. The "needle" program, which uses the Needleman-Wunsch global alignment algorithm (Needleman and Wunsch (1970) *J. Mol. Biol.* 48:443-453) to find the optimum alignment (including gaps) of two sequences when considering their entire length, may for example be used when performing a global alignment. This needle program is for example available on the ebi.ac.uk world wide web site. The percentage of identity in accordance with the invention is preferably calculated using the EMBOSS::needle (global) program with a "Gap Open" parameter equal to 10.0, a "Gap Extend" parameter equal to 0.5, and a Blosum62 matrix.

Variants of a reference sequence may comprise mutations such as deletions, insertions and/or substitutions compared to the reference sequence. In case of substitutions, the substitution preferably corresponds to a conservative substitution as indicated in the table below.

| Conservative substitutions | Type of amino acid |
| --- | --- |
| Ala, Val, Leu, Ile, Met, Pro, Phe, Trp | Amino acids with aliphatic hydrophobic side chains |
| Ser, Tyr, Asn, Gln, Cys | Amino acids with uncharged but polar side chains |
| Asp, Glu | Amino acids with acidic side chains |
| Lys, Arg, His | Amino acids with basic side chains |
| Gly | Neutral side chain |

Expression Vector

The expression vector used in the context of the invention is suitable for the production of a recombinant protein, and comprises a sequence encoding dihydroorotate dehydrogenase (DHODH).

The expression vector is preferably a DNA vector.

The expression vector used in the context of the invention comprises a sequence encoding an exogenous DHODH as defined in section "Exogenous DHODH" above.

In a specific embodiment, the cell line into which the expression vector is to be introduced is a CHO cell line, and the exogenous DHODH is of heterologous origin (i.e. exogenous DHODH is not a hamster DHODH).

The sequence encoding such an exogenous DHODH may be the naturally occurring nucleotide sequence. Alternatively, the triplet codons of the sequence encoding such a DHODH may be biased for expression in CHO cells. Software and algorithms for biasing sequence in order to obtain an optimal expression are known in the art and include, e.g. the algorithm described in Raab et al. (2010) *Syst Synth Biol.* 4:215-225. This algorithm not only provides the best available codons for expression, but also takes into account the GC content and the absence of non-desired DNA motifs.

For instance, the sequence encoding the exogenous DHODH may comprise or consist of a sequence at least 60%, 62%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% identical to the sequence of SEQ ID NO: 3 (i.e. a sequence encoding the human DHODH of SEQ ID NO: 4, which has been designed for optimal expression in CHO cells) and/or to the sequence of SEQ ID NO: 1 (i.e. a sequence encoding a hamster DHODH of SEQ ID NO: 2, which has been designed for optimal expression in CHO cells).

In one embodiment, the sequence encoding the exogenous DHODH comprises or consists of a sequence of SEQ ID NO: 1 or SEQ ID NO: 3.

In the expression vector used in the context of the invention, the sequence encoding the exogenous DHODH defined above may be placed under the control of any promoter known to those skilled in the art.

For instance, the sequence encoding the exogenous DHODH defined above may for example be placed under the control of a promoter suitable for driving expression of DHODH, for instance a Simian vacuolating virus 40 (SV40) promoter (e.g. the late or the early promoter of SV40), CMV promoter, Elongation Factor 1 promoter, GAPDH promoter, RPL37 promoter, Actin Promoter. An early SV40 promoter is for example described in Benoist and Chambon (1981) *Nature* 290:304-310 and in Moreau et al. (1981) *Nucleic Acids Res.* 9:6047-6068. In particular, said SV40 promoter is a full-length promoter. Said SV40 promoter may also have a replication origin containing a 72 bp repeat.

In some embodiments, said SV40 promoter is not an SV40 promoter in which positions 128 to 270 have been removed, i.e. said SV40 promoter is not the SV40 promoter described in Korean patent No. 10-0267720 and transforming the E. coli transformant deposited to the Gene Bank, Institute of Bioengineering, KIST on 17 Dec. 1997 under the Deposition Number: KCTC 8860 P.

In other embodiments, the sequence encoding the exogenous DHODH defined above is not placed under the control of a SV40 promoter.

Expression vectors that are suitable for the production of recombinant proteins are known to those skilled in the art. Such vectors typically correspond to expression vectors that comprise an origin of replication and at least one expression cassette allowing the cloning and the expression of the recombinant protein for which production is desired. An expression cassette typically comprises a 5' untranslated region (comprising or consisting of a promoter, and optionally an enhancer sequence), one or more restriction sites allowing the cloning of a sequence encoding the recombinant protein, a 3' untranslated region (e.g. a polyA signal), and optionally one or more introns. The promoter sequence may correspond to any strong promoter well-known to the art, such as e.g. the human CMV promoter. Optionally, the expression vectors used in the context of the invention comprise a prokaryotic origin of replication (e.g. a prokaryotic replicon such as ColE1 in E. coli) and at least a prokaryote-selective marker gene, also known as prokaryotic selectable marker, so that the vectors allows for replication in prokaryotic cells. The cells which replicate the vectors also express the prokaryote-selective marker gene, and therefore can be identified and selected. Prokaryote-selective marker genes are well known to the person skilled in the art. Examples of prokaryote-selective marker genes are for instance nucleic acid sequences encoding a protein conferring antibiotic resistance (e.g. a sequence encoding a protein conferring resistance to ampicillin, chloramphenicol, blasticidin or kanamycin).

The recombinant protein may correspond to any protein that is of interest to those skilled in the art.

As used herein, the term "protein" is meant to encompass peptides (i.e. amino acid chains of less than 50 amino acids), polypeptides (i.e. amino acid chains of at least 50 amino acids), monomeric proteins (i.e. proteins consisting of one amino acid chain) and multimeric proteins (i.e. proteins consisting of two or more amino acid chains, such as e.g. monoclonal antibodies).

The expression vector used in the context of the invention typically comprises a number of expression cassettes that is identical to the number of different amino acid chains that constitute the protein (e.g. one expression cassette in case of a monomeric protein or homodimeric protein, two in the case of a heterodimeric protein or of a monoclonal antibody, etc.)

Alternatively, the expression vector used in the context of the invention may comprise only one expression cassette even when production of a heterodimeric protein or of a monoclonal antibody is desired. In such a case, the sequence(s) encoding the other amino acid chain(s) of the protein is (are) present on a separate expression vector, which is co-transfected with the expression vector according to the invention into the host cell line, in particular into the CHO cell line.

In that case, the supplemental separate expression vectors may comprise selection markers different from the DHODH selection marker described herein, such as DHFR, GS or HPRT.

In one embodiment, the expression vector used in the context of the invention may be devoid of expression cassette. In such a case, the expression cassette(s) suitable for expression of the recombinant protein is (are) present on a separate vector, which is co-transfected with the expression vector according to the invention into the host cell line, in particular into the DHODH-inactivated cell line of the invention, more particularly into the DHODH-inactivated CHO cell line of the invention.

Thus, in some embodiments, the expression vector used in the context of invention comprises:
- a sequence encoding exogenous DHODH, as defined above, placed under the control of the early SV40 promoter;
- a first expression cassette, in which the sequence encoding the light chain of the antibody is placed under the control of the CMV promoter;
- a second expression cassette, in which the sequence encoding the heavy chain of the antibody is placed under the control of the CMV promoter;
- a prokaryotic origin of replication; and
- a selectable marker for use in prokaryotic cells, namely a sequence encoding a protein conferring resistance to ampicillin, placed under the control of its natural promoter.

Throughout the present specification, the term "recombinant protein" refers to any recombinant protein for which production is desired. It can for example correspond to a therapeutic and/or a prophylactic protein, i.e. a protein intended for use as a medicament (including vaccines). In a specific embodiment, the recombinant protein for which production is desired is not a DHODH. In another specific embodiment, the recombinant protein for which production is desired is an antibody, for instance a monoclonal antibody. In still another specific embodiment, the recombinant protein for which production is desired is an antigenic protein.

The term "antibody" is used herein in the broadest sense and specifically covers monoclonal antibodies (including full length monoclonal antibodies) of any isotype such as IgG, IgM, IgA, IgD, and IgE, polyclonal antibodies, multi-specific antibodies (including bispecific and trispecific antibodies), antibody fragments (such as e.g. Fv, scFv, ds, Fab, Fab', or F(ab')$_2$ fragments), single domain antibodies and fragment thereof, and fusion proteins comprising an antibody fragment. An antibody reactive with a specific antigen can be generated by recombinant methods such as selection of libraries of recombinant antibodies in phage or similar vectors, or by immunizing an animal with the antigen or an antigen-encoding nucleic acid.

A "monoclonal antibody", as used herein, is an antibody obtained from a population of substantially homogeneous antibodies, i.e. the antibodies forming this population are essentially identical except for possible naturally occurring mutations which might be present in minor amounts. These antibodies are directed against a single epitope (or a single group of epitopes in the case of multispecific monoclonal antibodies) and are therefore highly specific.

A typical monoclonal antibody is comprised of two identical heavy chains and two identical light chains that are joined by disulfide bonds. Each heavy and light chain contains a constant region and a variable region. Each variable region contains three segments called "complementarity-determining regions" ("CDRs") or "hypervariable regions", which are primarily responsible for binding an epitope of an antigen. They are usually referred to as CDR1, CDR2, and CDR3, numbered sequentially from the N-terminus (see Kabat et al., Sequences of Proteins of Immunological Interest, 5th edition, National Institute of Health, Bethesda, MD, 1991). The more highly conserved portions of the variable regions are called the "framework regions".

The monoclonal antibody may for example be a murine antibody, a chimeric antibody, a humanized antibody, or a fully human antibody.

The monoclonal antibody may be a monospecific, a bispecific or a trispecific antibody.

When the recombinant protein for which production is desired is a monoclonal antibody, the expression vector according to the invention may comprise a first expression cassette suitable for cloning of the antibody light chain, and a second expression cassette suitable for cloning of the antibody heavy chain.

In a specific embodiment, said first and second expression cassettes each comprise the cytomegalovirus (CMV) promoter, for instance a CMV promoter from a human or a murine CMV. More specifically, said first and second expression cassettes may comprise:
- a CMV immediate early enhancer promoter (e.g. the one having the sequence described in Teschendorf et al. (2002) *Anticancer Res.* 22:3325-3330); or
- a IE2 promoter/enhancer region from mouse CMV (e.g. the one having the sequence described in Chatellard et al. (2007) *Biotechnol Bioeng.* 96:106-117); or
- a hCMV-MIE regulatory element (e.g. the one having the sequence described in WO 89/01036).

The term "antigenic protein" is used herein in the broadest sense and covers any protein capable of generating an immune response, either alone or in combination with an adjuvant. It may be intended for use either in a prophylactic vaccine or in a therapeutic vaccine. In a specific embodiment the antigenic protein is a vaccinal protein, i.e. a protein intended for use in a prophylactic vaccine.

The expression vector may either comprise at least one sequence encoding the recombinant protein of interest (e.g. one sequence encoding a monomeric protein, one sequence encoding an antibody chain, or two sequences, encoding an antibody light chain and an antibody heavy chain, respectively), or it may be empty (i.e. devoid of such a sequence encoding the recombinant protein of interest).

Expression System, Kits, Methods and Uses

The present invention provides an expression system comprising:
(i) a cell line as defined in the section "Cell line" above comprising an endogenous DHODH gene which is partially or fully inactivated as defined in the section "Cell line" above, and
(ii) an expression vector as defined in the section "Expression vector" above.

The expression system of the invention may further comprise supplemental separate expression vectors, each comprising a nucleotide sequence encoding a selection marker different from DHODH such as DHFR, GS or HPRT, and at least one expression cassette for expressing a recombinant protein.

Alternatively, the expression system of the invention may further comprise supplemental expression vectors as defined in the section "Expression vector" above.

The invention provides a kit comprising (i) the cell line according to the invention comprising the expression vector as defined in the section "Expression vector" above, or the expression system according to the invention, and (ii) a culture medium devoid of uridine, as defined above.

The kit may comprise an exogenous DHODH-encoding expression vector (in the expression system) as described above. In such a kit, the vector is preferably empty, since this allows the cloning of the protein of interest for those skilled in the art. In addition, the expression vector is preferably isolated from the cell line in such a kit.

The kit further comprises a culture medium devoid of uridine, as defined in the section "Cell line" above.

The kit may further comprise media suitable for cultivation of the cell line, media suitable for transfection of the vector into the cell line, a packaging material and/or instructions for use of the expression system.

In a particular embodiment, the kit is devoid of DHODH inhibitor.

Examples of DHODH inhibitors include bicinchoninic acid, brequinar (6-fluoro-2-(2'-fluoro-1,1'-biphenyl-4-yl)-3-methyl-4-quinoline carboxylic acid), naphthoquinone derivatives such as dichloroally lawsone, isoxazole derivatives such as leflunomide (5-methyl-N-[4-(trifluoromethyl)phenyl]-isoxazole-4-carboxamide) and its active metabolite teriflunomide ((2Z)-2-cyano-3-hydroxy-N-[4-(trifluoromethyl)phenyl]but-2-enamide), quinolone carboxylic acids, naphthoquinones, isoxazoles, phenoxyquinolines, redoxal and derivatives, lawsone, lapachol, atovaquone and (8-chloro-4-(2-chloro-4-fluoro-phenoxy)quinoline). An inhibitor of DHODH may be able to inhibit DHODH activity by at least 20, 30, 40, 50, 60, 70, 80, 90, 95, 99 or 100%.

In a particular embodiment, the kit is devoid of teriflunomide.

The invention further provides the use of the cell line according to the invention comprising the expression vector as defined in the section "Expression vector" above, the expression system according to the invention, or the kit according to the invention, for producing a recombinant protein in vitro.

In a particular embodiment, said cell line, expression system or kit is used in combination with a culture medium devoid of uridine as defined above, more particularly in the absence of a DHODH inhibitor.

The invention further provides the use of the expression system according to the invention, of the cell line according to the invention comprising the expression vector as defined in the section "Expression vector" above, or of the kit according to the invention, for isolating a clone cell which produces high levels of a recombinant protein ("high producing clones") in vitro, in particular in the absence of a DHODH inhibitor.

In the context of the invention, the term "high level of a recombinant protein" is intended to mean that in the culture medium the concentration of recombinant protein is of at least 0.05 g/l, preferably at least 0.1 g/l, still preferably at least 0.2 g/l, more preferably between 0.3 and 1 g/l. The concentration of recombinant protein can be determined by methods which are well known to the person skilled in the art, including in particular Enzyme-linked immunosorbent assay (ELISA), Western blot, a caliper technology and a range of concentration of the purified protein corresponding to the recombinant protein.

The invention further provides an in vitro method of producing a recombinant protein comprising the steps of:
A) a1) providing a cell line according to the invention comprising the expression vector as defined in the section "Expression vector" above;
or
a2) providing a cell line according to the invention, and a2') introducing an expression vector as defined in the section "Expression vector" above into the cell line provided in step a2);

or a3) providing a cell line comprising en endogenous DHODH gene, a3') partially or fully inactivating the endogenous DHODH gene in the cell line provided in step a3), and a3") introducing an expression vector as defined in the section "Expression vector" above into the cell line comprising a partially or fully inactivated endogenous DHODH gene obtained in step a3');

B) culturing said cell line under conditions suitable for production of the recombinant protein; and C) isolating and/or purifying said recombinant protein.

In a particular embodiment, step B) of the above method is conducted in a culture medium devoid of uridine, more particularly also devoid of DHODH inhibitor, and in particular comprises a sub-step consisting in selecting the transfected cells which grow despite the absence of uridine, in particular further in the absence of DHODH inhibitor.

The invention further provides an in vitro method of isolating a clone cell which produces high levels of recombinant protein, said method comprising or consisting of the following steps:

A) a1) providing a cell line according to the invention comprising the expression vector as defined in the section "Expression vector" above;

or a2) providing a cell line according to the invention, and a2') introducing an expression vector as defined in the section "Expression vector" above into the cell line provided in step a2);

or a3) providing a cell line comprising an endogenous DHODH gene, a3') partially or fully inactivating the endogenous DHODH gene in the cell line provided in step a3), and a3") introducing an expression vector as defined in the section "Expression vector" above into the cell line comprising a partially or fully inactivated endogenous DHODH gene obtained in step a3');

B) culturing said cell line under conditions suitable for production of the recombinant protein; and C) isolating a clone which produces high levels of a recombinant protein.

In a particular embodiment, step B) of the above method is conducted in a culture medium devoid of uridine, more particularly also devoid of DHODH inhibitor, and in particular comprises a sub-step consisting in selecting the transfected cells which grow despite the absence of uridine, in particular further in the absence of DHODH inhibitor. Said expression vector can be introduced into said cell line, in steps a2') or a3") by any technique well-known from the skilled person, such as by transfection, in particular by electoporation or chemical transfection, or transduction.

Conditions suitable for production of recombinant proteins are well-known to those skilled in the art. The protocols described in the Examples may for instance be used.

In a specific embodiment, the culture medium used in step B) comprises decreasing concentrations of uridine. This allows selecting clones in which the vector-derived exogenous DHODH gene (and thus the sequence encoding the recombinant protein) has been amplified.

The above methods may further comprise the step of formulating the recombinant protein into a pharmaceutical composition.

Throughout the specification, terms such as "comprises", "comprised" and "comprising" have the meaning attributed to them in most patent jurisdictions, preferably in the jurisdiction in question; e.g. they can mean "includes", "included", "including", etc. Terms such as "consisting of", "consisting essentially of" and "consists essentially of" have the meaning ascribed to them in most patent jurisdictions, preferably in the jurisdiction in question; e.g. they imply the exclusion of all, most or all but a negligible amount of other elements, they allow for elements not explicitly recited, but exclude elements that are found in the prior art or that affect a basic or novel characteristic of the invention.

Several documents are cited throughout the text of this specification. Each of the documents cited herein (including any journal article or abstract, published or unpublished patent application, issued patent, manufacturer's specifications, instructions, etc.) are hereby incorporated by reference. However, there is no admission that any document cited herein is indeed prior art in respect of the present invention.

The invention will further be described by reference to the following drawings and examples, which are illustrative only, and are not intended to limit the present invention.

The invention is defined by the claims, which should be interpreted with the help of the description and the drawings.

Brief Description of the Sequences

| SEQ ID NO: | Description |
|---|---|
| 1 | cDNA sequence encoding DHODH of Chinese hamster (*Cricetulus griseus* origin |
| 2 | amino acid sequence of DHODH of Chinese hamster origin |
| 3 | cDNA sequence encoding DHODH of human origin |
| 4 | amino acid sequence of DHODH of human origin |
| 5 | corresponding piece of DNA for generating gRNA |
| 6 | oligonucleotide used for obtaining gRNA (Sequence1) |
| 7 | oligonucleotide used for obtaining gRNA (Sequence1) |
| 8 | oligonucleotide used for obtaining gRNA (Sequence2) |
| 9 | oligonucleotide used for obtaining gRNA (Sequence2) |
| 10 | oligonucleotide used for obtaining gRNA (Sequence3) |
| 11 | oligonucleotide used for obtaining gRNA (Sequence3) |
| 12 | oligonucleotide used for obtaining gRNA (Sequence4) |
| 13 | oligonucleotide used for obtaining gRNA (Sequence4) |
| 14 | oligonucleotide used for obtaining gRNA (Sequence5) |
| 15 | oligonucleotide used for obtaining gRNA (Sequence5) |
| 16 | oligonucleotide used for obtaining gRNA (Sequence6) |
| 17 | oligonucleotide used for obtaining gRNA (Sequence6) |
| 18 | oligonucleotide used for obtaining gRNA (Sequence7) |
| 19 | oligonucleotide used for obtaining gRNA (Sequence7) |
| 20 | oligonucleotide used for obtaining gRNA (Sequence8) |
| 21 | oligonucleotide used for obtaining gRNA (Sequence8) |
| 22 | CHO DHODH gene sequence |
| 23 | corresponding piece of DNA for generating gRNA |
| 24 | oligonucleotide used for obtaining gRNA (Sequence1') |
| 25 | oligonucleotide used for obtaining gRNA (Sequence1') |
| 26 | amino acid sequence of human DHODH G202A |
| 27 | oligonucleotide used for obtaining gRNA (Sequence2') |
| 28 | oligonucleotide used for obtaining gRNA (Sequence2') |
| 29 | oligonucleotide used for obtaining gRNA (Sequence3') |
| 30 | oligonucleotide used for obtaining gRNA (Sequence3') |
| 31 | oligonucleotide used for obtaining gRNA (Sequence4') |
| 32 | oligonucleotide used for obtaining gRNA (Sequence4') |
| 33 | oligonucleotide used for obtaining gRNA (Sequence5') |
| 34 | oligonucleotide used for obtaining gRNA (Sequence5') |
| 35 | oligonucleotide used for obtaining gRNA (Sequence6') |
| 36 | oligonucleotide used for obtaining gRNA (Sequence6') |
| 37 | oligonucleotide used for obtaining gRNA (Sequence7') |
| 38 | oligonucleotide used for obtaining gRNA (Sequence7') |

-continued

| SEQ ID NO: | Description |
|---|---|
| 39 | oligonucleotide used for obtaining gRNA (Sequence8') |
| 40 | oligonucleotide used for obtaining gRNA (Sequence8') |
| 41 | 603 sense oligonucleotide |
| 42 | 503 antisense oligonucleotide |
| 43 | Sequence including targeted sequence and PAM |
| 44 | Sense DHODH exon2 sequence region including CrispR sequence no1 |
| 45 | Antisense DHODH exon2 sequence region including CrispR sequence no1 |

EXAMPLES

Example 1: Obtaining the CHO 9E4 Cell Line

This example describes the obtaining of the CHO 9E4 cell line from the CHO-K1 cell line commercially available from the ATCC under the Number ATCC CCL-61.

1. The CHO-K1 Cell Line

A vial of CHO-K1 cells (ATCC CCL-61) frozen in the presence of calf serum in 1969 was obtained from the ATCC.

2. Thawing of the Vial in Ex-Cell™ 302 Medium and Preparation of the CHO-LG-APF Bank The CHO-K1 vial was thawed directly in Ex-Cell™ 302 medium (SAFC) supplemented with 4 mM glutamine and amplified on static support, then in spinner. The resulting CHO-LG-APF bank was frozen in Ex-Cell™ 302 medium after 12 passages and 17.3 generations.

3. Thawing of the CHO-LG-APF Bank in Ex-Cell™ 302 Medium and Preparation of the ABC-024 P22 Bank The CHO-LG-APF vial was thawed in Ex-Cell™ 302 medium and amplified. The resulting ABC-024 P22 bank was thawed after 18.5 generations.

4. Adapting the CMV07-024 Bank to CDCHO Fusion Medium and Preparation of the ABC-003 Bank The CMV07-024 bank was thawed and directly adapted to Ex-cell™ CDCHO Fusion medium (SAFC) supplemented with 4 mM Glutamine and adapted in shaker over 12.5 generations until freezing the ABC-003 bank in Ex-cell™ CDCHO Fusion medium.

5. Thawing the ABC-003 Bank in CDCHO Fusion Medium and Preparation of the ABC-053 Bank in CDCHO Fusion Medium The ABC-003 vial was thawed in CDCHO Fusion medium, and, after a dilution, the ABC-53 bank was frozen after 4.2 generations.

6. Thawing the ABC-053 Bank in CDCHO Fusion Medium, Selection, Cloning and Preparation of the P15A11 Bank in CDCHO Fusion Medium The ABC-053 bank was thawed in Ex-cell™ CDCHO Fusion medium (SAFC) supplemented with 4 mM glutamine. After amplification of the culture, it was cloned by limiting dilution in plates, and then amplified in CDCHO Fusion medium. The bank of the clone P15A11 resulting from this cloning was frozen. This cloning and amplification corresponds to about 94 generations.

7. Thawing the P15A11 Bank in CDCHO Fusion Medium, Adapting the Bank by Direct Passage in CDCHO and Preparing the CHOSP10-002 Bank in CDCHO Medium The P15A11 bank was thawed in Ex-cell™ CDCHO Fusion medium (SAFC) supplemented with 4 mM glutamine, and after 2 passages in CDCHO Fusion medium, the cells were diluted in CDCHO medium. After 3 passages in CDCHO medium, the CHOSP10-002 bank was frozen after a total of 15.9 generations.

8. Thawing the CHOSP10-002 Bank in CDCHO Medium, Amplification, Elimination of Masses by Centrifugation and Selection by Subculture without Masses in 96-Well Plates, Amplification in 6-Well Plates and in Shaker to Prepare the CHOSP10-012 Bank in CDCHO Medium The CHOSP10-002 bank was thawed in CDCHO medium (Invitrogen) supplemented with 6 mM glutamine, then amplified. The culture was centrifuged in order to eliminate cellular masses and continue the culture with only cells isolated from the supernatant. At this stage, from thawing, 11.3 generations were generated.

This culture was split in 96-well plates at 10 cells per well. The wells with cells which multiply isolately in suspension were amplified in 6-well plates, then in shaker. There were 23.2 additional generations until the CHOSP10-012 bank was frozen.

9. Thawing the CHOSP10-012 Bank, Amplification and Preparation of the CHOSP11-008 Bank (9E4 Bank)

The CHOSP10-012 bank was thawed in CDCHO medium (Invitrogen) supplemented with 6 mM glutamine, then amplified from the Erlenmeyer stage to the 17 l bioreactor.

The 9E4 bank was frozen after a total of 10 generations.

Example 2: Production of a CHO Cell Line Wherein the DHODH Gene is Invalidated

A—Design and Construction of CRISPR CAS9 Guide RNA (gRNA)

To invalidate the DHDOH gene in CHO cells, the inventors started by recovering the hamster DHODH gene sequence and using the publically available Tefor software for designing different guided RNA (gRNA) for transfection with CRISPR-Cas9 in the CHO genome. The whole CHO DHODH sequence, with introns and exons, is shown in FIG. 1.

The software determined 8 sequences that could target the DHODH gene:

```
Sequence1
                                       (SEQ ID NO: 6)
CACCGGGATGCAGCCATCATCCTTG (SEQ ID NO: 7)
AAAACCAAGGATGATGGCTGCATCC Sequence2
                                       (SEQ ID NO: 8)
CACCGGATGCAGCCATCATCCTTGG (SEQ ID NO: 9)
AAAACCCAAGGATGATGGCTGCATC Sequence3
                                       (SEQ ID NO: 10)
CACCGGCAGCCATCATCCTTGGGGG (SEQ ID NO: 11)
AAAACCCCCCAAGGATGATGGCTGC Sequence4
                                       (SEQ ID NO: 12)
CACCGGCCATCATCCTTGGGGGAGG (SEQ ID NO: 13)
AAAACCCTCCCCCAAGGATGATGGC Sequence5
                                       (SEQ ID NO: 14)
CACCGGCTATTCGCTTCACGTCCCT
```

-continued

```
                                      (SEQ ID NO: 15)
AAAACAGGGACGTGAAGCGAATAGC

Sequence6
                                      (SEQ ID NO: 16)
CACCGGCCTCTACAAACTGGGCTTT (SEQ ID NO: 17)
AAAACAAAGCCCAGTTTGTAGAGGC Sequence7
                                      (SEQ ID NO: 18)
CACCGGGCTTTGGGTTTGTCGAGGT (SEQ ID NO: 19)
AAAACACCTCGACAAACCCAAAGCC Sequence8
                                      (SEQ ID NO: 20)
CACCGGCTGGTCTGAGGAGCCTACA (SEQ ID NO: 21)
AAAACTGTAGGCTCCTCAGACCAGC
```

Figure 2:
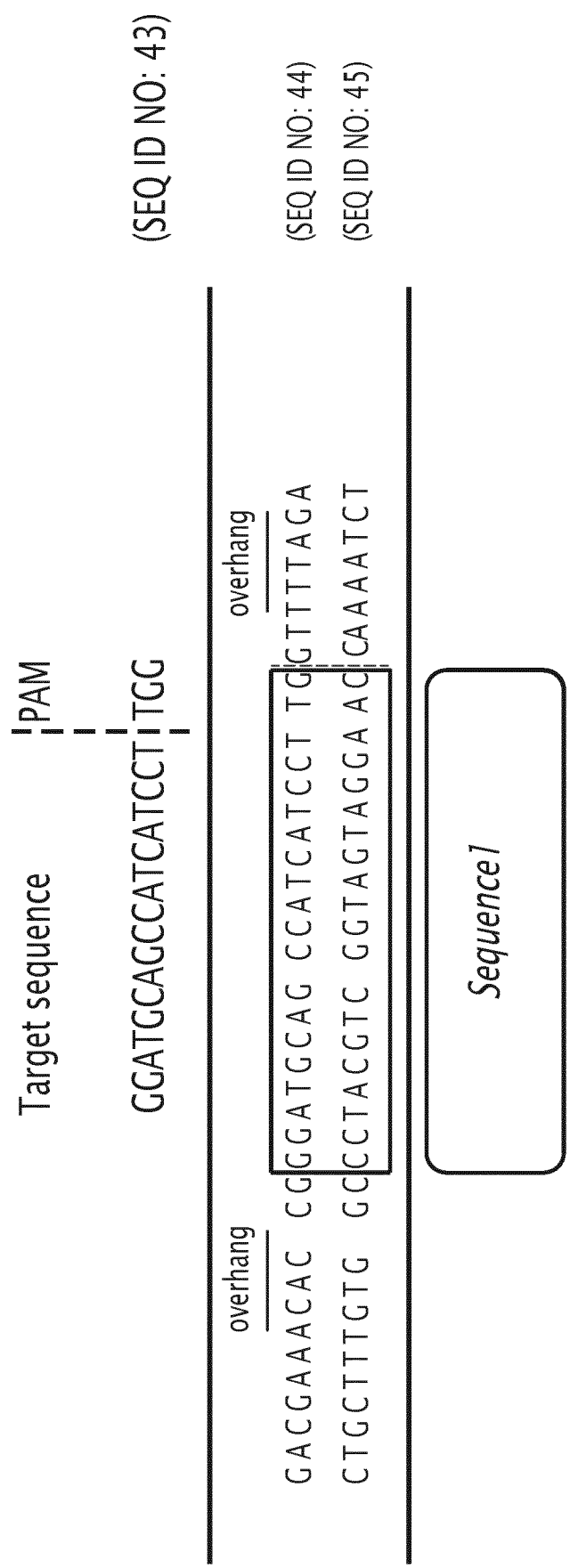
FIG. 2 shows the alignment of the sequence n° 1 DHODH exon2. PAM: Protospacer Adjacent Motif sequence (TGG).

Although the 8 sequences were tested and cloned, among the 8 sequences, only four cloned sequences were transfected and only one was successful for generating a knockout of the DHODH gene. The following 20 nucleotide sequence was used GGATGCAGCCATCATCCTTG (SEQ ID NO: 5) as the corresponding piece of DNA for generating the gRNA as shown on FIG. 2. It is targeting the second exon of the DHODH gene. To obtain the transcription of the proper gRNA, two oligonucleotides CACCGG-GATGCAGCCATCATCCTTG (oligo1, SEQ ID NO: 6) and AAAACCAAGGATGATGGCTGCATCC (oligo2, SEQ ID NO: 7) were synthetically made, annealed and cloned at the unique BaeI site of pCM3561 (commercialized by Invitrogen).

The cloned DNA sequence was thereby under the control of the U6 promoter and once the DNA was transfected in CHO cells, it was transcribed into a single transcription unit containing a crRNA fused to tracrRNA. The crRNA part was specific to the second exon of DHODH gene while the tracrRNA was recognized by the Cas9 enzyme itself.

B—Preparation of the Material for CRISPR-Cas9 Gene Editing

CHO 9E4 cells were isolated and selected from the CHO K-1 cells purchased from ATCC, as disclosed in Example 1, and were grown and maintained as suspension cultures in CDCHO serum-free and chemically-defined medium optimized for the growth of Chinese Hamster Ovary (CHO) cells supplemented with 6 mM L-glutamine at 37° C. in an incubator with 8% $CO_2$ and 80% humidity.

10 µg of sgRNA expressing vector (pCM3561) were digested with 1 µL of BaeI enzyme at 5 units/µl supplement with 20 µM S-adenosylmethionine (SAM) at 25° C. for 1 hour, then the digested plasmid was separated by electrophoresis using 1% agarose gel. The resulting sgRNA cloning vector was then recovered by gel extraction kit (Qiagen Kit).

sgRNA cloning vector and annealed guide oligonucleotides were ligated using the T4 DNA ligase enzyme (Biolabs) and incubated for 10 min at room temperature.

5 µL of ligation products were added to 50 µL of E. coli DH5a competent cells (Invitrogen).

Cells and DNA were incubated 30 min on ice, and then heat shocked at 42° C. for 45 s. After adding 500 mL S.O.C medium, the 1-hour incubation at 37° C. (at 800 rpm) gave the bacteria time to generate the antibiotic resistance proteins encoded on the plasmid backbone. After the incubation, each tube was spread on one coated LB supplemented with 100 µg/mL ampicillin. The dishes were incubated overnight at 37° C. Negative controls (with water instead of insert DNA) were used to evaluate the success of the transformation.

For the amplification step, two colonies were chosen per construction and seeded in 2 mL of LB medium supplemented with 100 µg/ml of ampicillin in tube placed in the incubator overnight (at 37° C., 700 rpm). The overnight-incubated culture was harvested by centrifugation. The QIAprep Miniprep Kit™ (QIAGEN) was used to recover the amplified DNA (elution in EB buffer). The sequence of the guide oligonucleotides of interest were then checked by Sanger sequencing (sense and antisense sequencing, GATC Company). After verification by alignment on Vector NTI software (Thermofisher Scientific), the corresponding colonies were used to seed 200 mL of LB medium supplemented with 100 µg/ml of ampicillin. After 24 hours incubation, bacteria were harvested by centrifuging at 6000 g for 15 min at 4° C. The EndoFree Plasmid Maxi Kit™ (QIAGEN) was used to prepare a MaxiPrep. DNA was precipitated by adding room temperature isopropanol. After a 1 h-centrifugation (at 4° C., 8000 rpm), the DNA pellet was washed by endotoxin-free room temperature 70% ethanol. After a short new centrifugation, the pellet was air-dried during 1 h and re-dissolved in a suitable volume of endotoxin-free sterile water to get a DNA concentration at 5 mg/mL. A nanodrop device was used to measure the DNA concentration.

Four different plasmids were prepared, namely the pBH6840 plasmid (KO DHODH SEQ1), the pBH6841 plasmid (KO DHODH SEQ4), the pBH6842 plasmid (KO DHODH SEQ5) and the pBH6843 plasmid (KO DHODH SEQ7). The target of these plasmids in the CHO DHODH gene is shown on sequence SEQ ID NO: 22.

DNA sequencing was performed by GATC subcontractor—A Eurofins Genomics Company.

C—CRISPR-Cas9 Gene Editing

The transfections were made by electroporation using MaxCyte STX and its CHO defined protocol. They were made in OC-100 (20 million cells per transfection) processing assemblies.

The day before transfection, cells were seeded at $1.5 \times 10^6$ cells/mL in CDCHO medium complemented with 6 mM L-Glutamine.

The day of the transfection, cells were numbered with the ViCell apparatus (Beckman & Coulter). The needed number of cells was centrifuged at 250 g for 10 min and the supernatant was thrown away.

For each transfection condition, $20 \times 10^6$ cells were centrifuged 10 min at 250 g. The pellet was resuspended with 70 µL Maxcyte buffer. 30 µg of DNA was added and the mix (cells, buffer and DNA) was transferred into a 100 µL Maxcyte electroporation cassette. The processing assembly used was the 00-100 specific to 100 µL cassette, and the optimized program for CHO was selected.

The following transfections were made.

| T1 | pBH6840 | KO DHODH SEQ1 |
|----|---------|---------------|
| T2 | pBH6841 | KO DHODH SEQ4 |
| T3 | pBH6842 | KO DHODH SEQ5 |
| T4 | pBH6843 | KO DHODH SEQ7 |
| T5 | W/O ADN | H2O           |

After electroporation, cells were transferred in 25 mL working Erlenmeyer flasks. They were put in a 37° C., 5% $CO_2$ static incubator for 45 min. 25 mL of CDCHO medium complemented with 6 mM L-Glutamine were then added to resuspend the cells and the Erlenmeyer flasks were put in 37° C., 5% $CO_2$, 70% humidity, 110 rpm shakers.

The day after electroporation, single cell per well were seeded by limiting dilution from the CHO9E4 transfected pools described above. After about 20 days, once the cells were approximately 90% confluent and appeared healthy when examined under the microscope, the cells were split into 2 new 96 well plates, with or without uridine.

Several clones were selected for their sensitivity to the lack of uridine. These clones were adapted for growth in CDCHO medium complemented with 6 mM of glutamine and 5 mM of uridine.

To confirm that the gene editing was successful, genomic DNA was extracted from the CRISPR-Cas9 clone cells using the Qiagen DNeasy Kit™ (Qiagen). The target locus was amplified by PCR using the appropriate primers for the region of the DHODH locus targeted by CRISPR-Cas9, and the PCR products were sequenced by NGS using PCR fragments covering the potential deleted regions.

Example 3: Alternative Production of a CHO Cell Line Wherein the DHODH Gene is Invalidated A—Design and Construction of CRISPR CAS9 Guide RNA (gRNA)

To invalidate the DHDOH gene in CHO cells, the inventors started by recovering the hamster DHODH gene sequence and using the publically available Tefor software for designing different guided RNA (gRNA) for transfection with CRISPR-Cas9 in the CHO genome.

The software determined 8 sequences that could target the DHODH gene:

```
Sequence1'
                                 (SEQ ID NO: 24)
GGATGCAGCCATCATCCTTGGTTTT (SEQ ID NO: 25)
CAAGGATGATGGCTGCATCCCGGTG Sequence2'
                                 (SEQ ID NO: 27)
GATGCAGCCATCATCCTTGGGTTTT (SEQ ID NO: 28)
CCAAGGATGATGGCTGCATCCGGTG Sequence3'
                                 (SEQ ID NO: 29)
GCAGCCATCATCCTTGGGGGGTTTT (SEQ ID NO: 30)
CCCCCAAGGATGATGGCTGCCGGTG Sequence4'
                                 (SEQ ID NO: 31)
GCCATCATCCTTGGGGGAGGGTTTT (SEQ ID NO: 32)
CCTCCCCCAAGGATGATGGCCGGTG Sequence5'
                                 (SEQ ID NO: 33)
GCTATTCGCTTCACGTCCCTGTTTT (SEQ ID NO: 34)
AGGGACGTGAAGCGAATAGCCGGTG Sequence6'
                                 (SEQ ID NO: 35)
GCCTCTACAAACTGGGCTTTGTTTT (SEQ ID NO: 36)
AAAGCCCAGTTTGTAGAGGCCGGTG Sequence7'
                                 (SEQ ID NO: 37)
GGCTTTGGGTTTGTCGAGGTGTTTT (SEQ ID NO: 38)
ACCTCGACAAACCCAAAGCCCGGTG Sequence8'
                                 (SEQ ID NO: 39)
GCTGGTCTGAGGAGCCTACAGTTTT (SEQ ID NO: 40)
TGTAGGCTCCTCAGACCAGCCGGTG
```

Although the 8 sequences were tested and cloned, among the 8 sequences, only four cloned sequences were transfected and only one was successful for generating a knock-out of the DHODH gene. The following 20 nucleotide sequence was used GGATGCAGCCATCATCCTTG (SEQ ID NO: 5) as the corresponding piece of DNA for generating the gRNA. It is targeting the second exon of the DHODH gene. To obtain the transcription of the proper gRNA, two oligonucleotides GGATGCAGCCATCATCCTTGGTTTT (oligo1', SEQ ID NO: 24) and CAAGGATGATGGCTG-CATCCCGGTG (oligo2', SEQ ID NO: 25) were synthetically made, annealed and cloned at the unique BaeI site of pCM3561 (commercialized by Invitrogen).

The cloned DNA sequence was thereby under the control of the U6 promoter and once the DNA was transfected in CHO cells, it was transcribed into a single transcription unit containing a crRNA fused to tracrRNA. The crRNA part was specific to the second exon of DHODH gene while the tracrRNA was recognized by the Cas9 enzyme itself.

B—Preparation of the Material for CRISPR-Cas9 Gene Editing

CHO 9E4 cells were isolated and selected from the CHO K-1 cells purchased from ATCC, as disclosed in Example 1, and were grown and maintained as suspension cultures in CDCHO serum-free and chemically-defined medium optimized for the growth of Chinese Hamster Ovary (CHO) cells supplemented with 6 mM L-glutamine at 37° C. in an incubator with 8% $CO_2$ and 80% humidity.

10 µg of sgRNA expressing vector (pCM3561) were digested with 1 µL of BaeI enzyme at 5 units/µl supplement with 20 µM S-adenosylmethionine (SAM) at 25° C. for 1 hour, then the digested plasmid was separated by electrophoresis using 1% agarose gel. The resulting sgRNA cloning vector was then recovered by gel extraction kit (Qiagen Kit).

sgRNA cloning vector and annealed guide oligonucleotides were ligated using the T4 DNA ligase enzyme (Biolabs) and incubated for 10 min at room temperature.

5 µL of ligation products were added to 50 µL of *E. coli* DH5a competent cells (Invitrogen).

Cells and DNA were incubated 30 min on ice, and then heat shocked at 42° C. for 45 s. After adding 500 mL S.O.C medium, the 1-hour incubation at 37° C. (at 800 rpm) gave the bacteria time to generate the antibiotic resistance proteins encoded on the plasmid backbone. After the incubation, each tube was spread on one coated LB supplemented with 100 µg/mL ampicillin. The dishes were incubated overnight at 37° C. Negative controls (with water instead of insert DNA) were used to evaluate the success of the transformation.

For the amplification step, two colonies were chosen per construction and seeded in 2 mL of LB medium supplemented with 100 μg/ml of ampicillin in tube placed in the incubator overnight (at 37° C., 700 rpm). The overnight-incubated culture was harvested by centrifugation. The QIAprep Miniprep Kit™ (QIAGEN) was used to recover the amplified DNA (elution in EB buffer). The sequence of the guide oligonucleotides of interest were then checked by Sanger sequencing (sense and antisense sequencing, GATC Company). After verification by alignment on Vector NTI software (Thermofisher Scientific), the corresponding colonies were used to seed 200 mL of LB medium supplemented with 100 μg/ml of ampicillin. After 24 hours incubation, bacteria were harvested by centrifuging at 6000 g for 15 min at 4° C. The EndoFree Plasmid Maxi Kit™ (QIAGEN) was used to prepare a MaxiPrep. DNA was precipitated by adding room temperature isopropanol. After a 1 h-centrifugation (at 4° C., 8000 rpm), the DNA pellet was washed by endotoxin-free room temperature 70% ethanol. After a short new centrifugation, the pellet was air-dried during 1 h and re-dissolved in a suitable volume of endotoxin-free sterile water to get a DNA concentration at 5 mg/mL. A nanodrop device was used to measure the DNA concentration.

Four different plasmids were prepared, namely the pBH6840 plasmid (KO DHODH SEQ1), the pBH6841 plasmid (KO DHODH SEQ4), the pBH6842 plasmid (KO DHODH SEQ5) and the pBH6843 plasmid (KO DHODH SEQ7).

DNA sequencing was performed by GATC subcontractor—A Eurofins Genomics Company.

C—CRISPR-Cas9 Gene Editing

The transfections were made by electroporation using MaxCyte STX and its CHO defined protocol. They were made in OC-100 (20 million cells per transfection) processing assemblies.

The day before transfection, cells were seeded at $1.5 \times 10^6$ cells/mL in CDCHO medium complemented with 6 mM L-Glutamine.

The day of the transfection, cells were numbered with the ViCell apparatus (Beckman & Coulter). The needed number of cells was centrifuged at 250 g for 10 min and the supernatant was thrown away.

For each transfection condition, $20 \times 10^6$ cells were centrifuged 10 min at 250 g. The pellet was resuspended with 70 μL Maxcyte buffer. 30 μg of DNA was added and the mix (cells, buffer and DNA) was transferred into a 100 μL Maxcyte electroporation cassette. The processing assembly used was the 00-100 specific to 100 μL cassette, and the optimized program for CHO was selected.

The following transfections were made.

| T1 | pBH6840 | KO DHODH SEQ1 |
| T2 | pBH6841 | KO DHODH SEQ4 |
| T3 | pBH6842 | KO DHODH SEQ5 |
| T4 | pBH6843 | KO DHODH SEQ7 |
| T5 | W/O ADN | H2O |

After electroporation, cells were transferred in 25 mL working Erlenmeyer flasks. They were put in a 37° C., 5% $CO_2$ static incubator for 45 min. 25 mL of CDCHO medium complemented with 6 mM L-Glutamine were then added to resuspend the cells and the Erlenmeyer flasks were put in 37° C., 5% $CO_2$, 70% humidity, 110 rpm shakers.

The day after electroporation, single cell per well were seeded by limiting dilution from the CHO9E4 transfected pools described above. After about 20 days, once the cells were approximately 90% confluent and appeared healthy when examined under the microscope, the cells were split into 2 new 96 well plates, with or without uridine.

Several clones were selected for their sensitivity to the lack of uridine. These clones were adapted for growth in CDCHO medium complemented with 6 mM of glutamine and 5 mM of uridine.

To confirm that the gene editing was successful, genomic DNA was extracted from the CRISPR-Cas9 clone cells using the Qiagen DNeasy Kit™ (Qiagen). The target locus was amplified by PCR using the appropriate primers for the region of the DHODH locus targeted by CRISPR-Cas9, and the PCR products were sequenced by NGS using PCR fragments covering the potential deleted regions.

Example 4: Use of the DHODH-Deficient CHO Cell Line to Produce Recombinant Proteins Antibody production was tested on validated DHODH-deficient CHO clones obtained in Example 2 or 3 to verify if these clones can express antibodies without teriflunomide.

The designed vectors were produced and prepared, at a concentration of 5 mg/mL. They all have the ITRs allowing the use of transposon system for the integration of the plasmids in the genome of the producing cells, apart from pBH6209 which is the plasmid encoding the transposase.

The cell lines used were CHO 9E4_SP11 wild-type and KO2 and KO19 knockout for DHODH.

CHO 9E4_SP11 was cultured in CDCHO medium with 6 mM L-Glutamine added.

KO2 and KO19 were cultured in CDCHO medium with 6 mM L-Glutamine and 5 mM Uridine added.

They were cultured in 25 mL-working Erlenmeyer flasks at the beginning and amplified until the number of viable cells needed was reached.

Different proteins were produced using high efficiency electroporation protocol developed by Maxcyte on the Maxcyte STX apparatus.

Cells were split at $1.5 \times 10^6$ one day before transfection.

On the day of transfection, the cells were cotransfected with two vectors: DNA plasmid expression vector containing human anti CD38 heavy chain (HC) and light chain (LC) expression cassettes and DHODH selection marker (as described in WO2016/062837) that were flanked by PiggyBac recognition sites (inverted terminal repeats, ITRs) and transposase vector from Transposagen that catalyses the transposon's mobilization into the CHO genome at TTAA sites.

For each transfection condition, $80 \times 10^6$ cells were centrifuged 10 min at 250 g. The pellet was resuspended with 250 μL Maxcyte buffer. 120 μg of DNA was added and the mix (cells, buffer and DNA) was transferred into a 400 μL Maxcyte electroporation cassette. The processing assembly used was the OC-400 specific to 400 μL cassette, and the optimized program for CHO was selected.

For the recovery phase, transfected cells were immediately transferred in a 125 ml flask at 37° C., 40 min without agitation. 25 mL pre-warmed CDCHO medium complemented with 6 mM glutamine (+5 mM uridine for KO cells) was added and the transfected cultures were maintained at 37° C. in an incubator with 8% $CO_2$ and 80% humidity. At 1-day post-transfection, cells were centrifuged and re-suspended in CD OPTiCHO™ selection medium (Gibco) supplemented with 6 mM glutamine, 30% FeedB (Gibco) and different amounts of teriflunomide (0, 5, 15 and 25 μM) at $1 \times 10^6$ cells/mL.

At day 14 post-transfection, the cells were centrifuged at 200 g, for 10 min at 25° C. The supernatant was filtered through a 0.22 μm PES filter and the antibody titer was measured using Octet apparatus.

Figure 3:
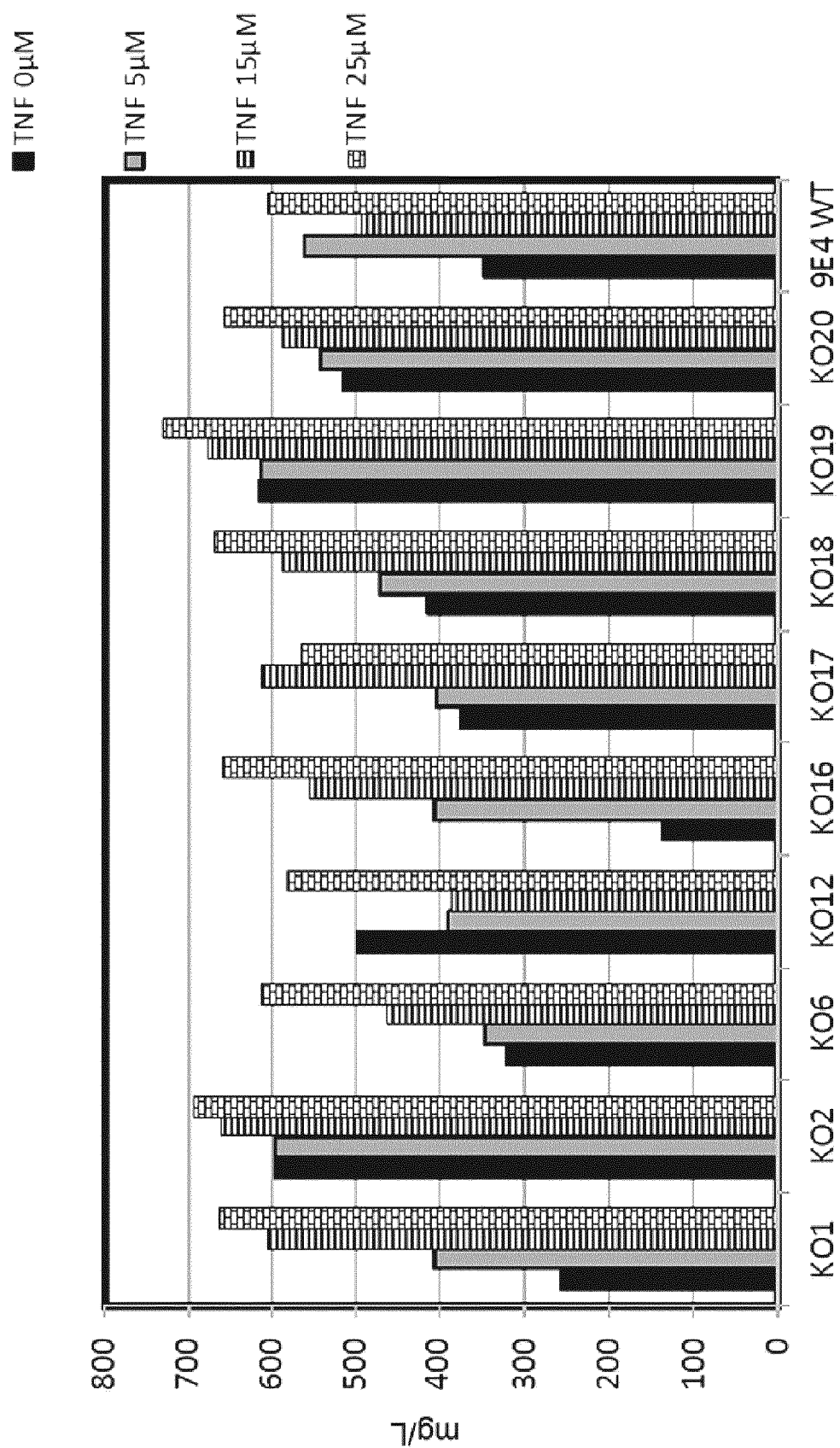
FIG. 3 shows the screening of different KO (knock-out) DHODH clones for producing antibodies in the presence of different concentrations of teriflunomide as a selective agent.

As shown on FIG. 3, two clones (KO2 and KO19) displayed good production without teriflunomide, and genomic NGS showed that these two clones contained knockout mutation at the two alleles of the DHODH locus.

Remarkably, all the KO clones produced antibodies even in the absence of teriflunomide as a selective agent. Two clones KO2 and KO19 were chosen for further studies. Moreover these quoted clones were the only ones showing a homozygous knock out of the DHODH gene.

This example thus shows that the invention provides a set of cell line and vectors permitting the production of antibodies without using any selective pressure.

Example 5: Evaluation of Three Human DHODH Variants

To verify if the use of impaired forms of the human DHODH enhances the integration copy number into the CHO genome and thereby allows a better productivity, the DHODH KO2, KO19 and WT CHO 9E4 cell lines were transfected with three human DHODH cDNA variants described in Miller syndrome patients (R135C, G202A and R346W, see in particular Fang et al. (2012) Biosci. 32:631-639). As control vector, the plasmid bearing a cDNA encoding human WT DHODH was transfected.

50 ng of plasmid vector encoding a human anti CD38 monoclonal antibody, mAb-A (pBH6204), digested with SalI-BglII restriction enzymes, was mixed with 37.5 ng of SalI-BglII purified DNA fragments corresponding to each variant (R135C, G202A, and R346W). After addition of 1 μL of T4-DNA ligase (BioLabs) and concentrated ligation buffer, the ligation reaction (final volume 10 μL) was performed 10 min at room temperature.

Aliquots of this DNA pool were then used to transform *E. coli* competent cells (Stellar™, Takara).

Small scale plasmid preparations were carried out with the commercially available Qiagen plasmid miniprep kit (Qiagen), according to the manufacturer's recommendations.

DNA sequencing using 603 sense (sequence GTTGGCCTTCCAATGGCTT, SEQ ID NO: 41) and 503 anti-sense (sequence GTTCCTTCACAAAGAT, SEQ ID NO: 42) oligonucleotides was performed by GATC subcontractor—A Eurofins Genomics Company.

The transfections of the DHODH variants were made by electroporation using MaxCyte STX. They are made in OC-100 processing assemblies as describe above.

At one day post-transfection, cells were centrifuged and re-suspended in CD CHO selection medium supplemented with 6 mM glutamine and 25 μM of teriflunomide for 9E4 CHO cells and without teriflunomide for KO2 and KO19 clones at $1 \times 10^6$ cells/mL.

After two passages, the production of mAb-A was started in CD OPTiCHO medium supplemented with 30% of FeedB and 6 mM of glutamine and 25 μM of teriflunomide for 9E4 CHO cells and without teriflunomide for KO2 and KO19 clones at $0.3 \times 10^6$ cells/mL.

At day 14 post-transfection, the cells were centrifuged at 200 g, 10 min at 25° C. The supernatant was filtered through a 0.22 μm PES filter and the antibody titer was measured using Octet apparatus.

Figure 4:
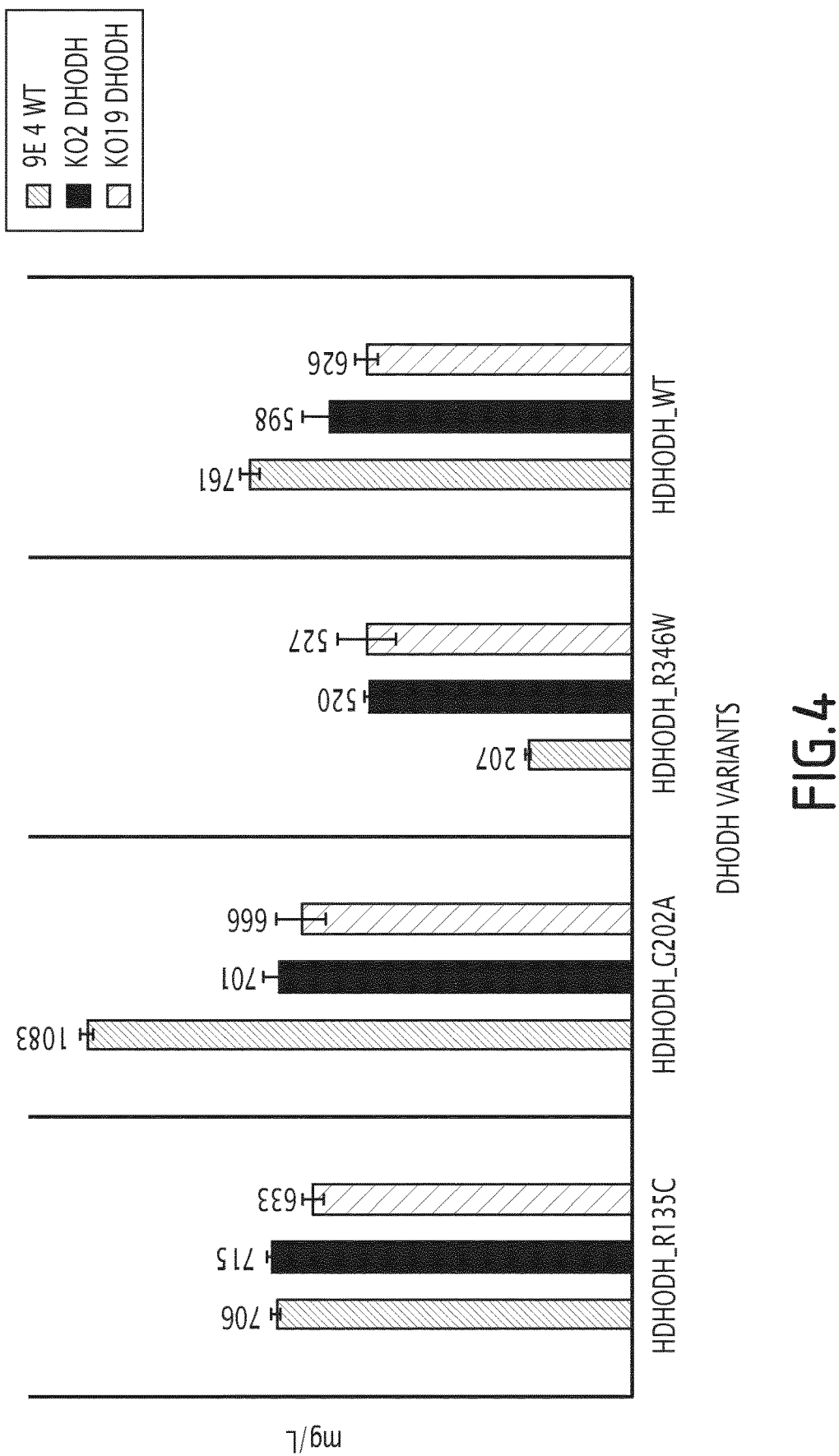
FIG. 4 shows the quantity of protein produced in mg/mL using different DHODH variants as selection markers.

As shown on FIG. 4, no significant effect was observed with the R138C and R346W DHODH mutations on the WT CHO 9E4 and DHODH KO clones. On the other hand, the G202A mutation allowed obtaining a gram scale antibody production with WT CHO 9E4 line and enhancing the productivity of the DHODH KO2 and KO19 clones.

Example 6: Protein Production Using the Expression System of the Invention

Different types of proteins were produced using the expression system of the invention, in particular using human DHODH cDNA including the above-disclosed G202A mutation on validated clones CHO 9E4 KO2 and KO19 disclosed in Example 3 above, to confirm that the final productivity is at least in the same range as the expression system of the prior art using human glutamine synthetase (GS) as selectable marker.

The following proteins were produced:
Lipase:
    using a monocistronic cDNA PLBL2-His, and
    using a selectable marker hDHODH G202A plasmid or hGS plasmid,
Monoclonal antibody (mAb-B):
    using a bicistronic cDNA encoding the VH and VL chains of the antibody, and
    using a selectable marker hDHODH G202A plasmid or hGS plasmid;
Bispecific antibody:
    using (i) a bicistronic cDNA encoding the VH and VL chains of the antibody or (ii) two monocistronic cDNAs encoding respectively the VH and VL chains of the antibody, and
    using a selectable marker (i) hDHODH G202A plasmid (for bicistronic cDNA) or (ii) two hDHODH G202A plasmids or a hDHODH G202A plasmid and a hGS plasmid (for monocistronic cDNAs);
Trispecific antibody:
    using two bicistronic cDNAs, and
    using a selectable markers hDHODH G202A plasmid and hGS plasmid.

One day before FectoPRO® transfection, the cells were diluted at $1.5 \times 10^6$ cells/mL in CD CHO medium supplemented with 6 mM glutamine and 5 mM uridine.

On the day of transfection, cell suspension was diluted at $1.1 \times 10^6$ cells/ml in CD CHO complemented with 6 mM L-glutamine and 5 mM uridine. The FectoPRO® reagent was vortexed for 5 s and spin down before adding 25 μL/tube to an empty 50 mL tube. In a second 50 mL tube, 12.5 μg of cDNA were diluted in CD CHO medium and the diluted DNA was poured into the pure FectoPRO® reagent all at once. The solution was homogenized immediately and incubated for 10 min. The FectoPRO®/DNA transfection mix was poured onto the cells and the culture was incubated at 37° C., 190 rpm and $CO_2$ levels at 8%.

24 hours post transfection cells were counted with Invitrogen™ Countess™ apparatus. The whole cell culture was centrifuged at 200 g, 10 min. The pellet was resuspended with 2 5 mL of pre-warmed production medium in the conditions disclosed below.

In case of complex proteins comprising 3 or more subunits, a second transfection is performed using again the protocol of transfection described above.

For lipase monocistronic vector (protein with His tag)

| Expression vectors used for transfection | Cells | Selection marker | Day of transfection medium | Post-transfection selective medium |
|---|---|---|---|---|
| AVEC-30778 | KO2 | DHODH_G202A | CD CHO + Uri + Gln | CD OPTiCHO + FeedB + Gln |

For monoclonal antibody mAb-B bicistronic VH and VL vector:

| Expression vectors used for transfection | Cells | Selection marker | Day of transfection medium | Post-transfection selective medium |
|---|---|---|---|---|
| pBH6450 | | GS | CD CHO + Gln | CD OPTiCHO + FeedB + MSX |
| AVEC-30778 | KO19 | DHODH_G202A | CD CHO + Uri + Gln | CD OPTiCHO + FeedB + Gln |
| pBH6450 | | GS | CD CHO + Gln | CD OPTiCHO + FeedB + MSX |
| AVEC-30778 | 9E4WT | DHODH G202A | CD CHO + Gln | CD OPTiCHO + FeedB + Gln + TNF |
| pBH6450 | | GS | CD CHO + Gln | CD OPTiCHO + FeedB + MSX |

MSX: L-methionine sulfoxymine;
Gln: glutamine;
Uri: uridine;
TNF: teriflunomide

For bispecific antibody bicistronic or two monocistronic VH and VL vectors:

| Expression vectors used for transfection | Cells | Selection marker | Day of transfection medium | Post-transfection selective medium |
|---|---|---|---|---|
| pVA4-00072 | KO2 | DHODH G202A | CD CHO + Uri + Gln | CD OPTiCHO + FeedB + Gln |
| pVA4-00070 | | GS | CD CHO + Gln | CD OPTiCHO + FeedB + MSX |
| pVA4-00072 | KO19 | DHODH G202A | CD CHO + Uri + Gln | CD OPTiCHO + FeedB + Gln |
| pVA4-00070 | | GS | CD CHO + Gln | CD OPTiCHO + FeedB + MSX |
| pVA4-00072 | 9E4WT | DHODH G202A | CD CHO + Gln | CD OPTiCHO + FeedB + Gln + TNF |
| pVA4-00070 | | GS | CD CHO + Gln | CD OPTiCHO + FeedB + MSX |
| pVA4-00073/ pVA4-00076 | KO2 | GS/ DHODH G202A | CD CHO + Uri + Gln | CD OPTiCHO + FeedB + MSX |
| pVA4-00073/ pVA4-00076 | KO19 | GS/ DHODH G202A | CD CHO + Uri + Gln | CD OPTiCHO + FeedB + MSX |
| pVA4-00073/ pVA4-00076 | 9E4WT | GS/ DHODH G202A | CD CHO + Gln | CD OPTiCHO + FeedB + MSX/TNF |
| pVA4-00074/ pVA4-00076 | KO2 | DHODH G202A/ DHODH G202A | CD CHO + Uri + Gln | CD OPTiCHO + FeedB |
| pVA4-00074/ pVA4-00076 | KO19 | DHODH G202A/ DHODH G202A | CD CHO + Uri + Gln | CD OPTiCHO + FeedB |
| pVA4-00074/ pVA4-00076 | 9E4WT | DHODH G202A/ DHODH G202A | CD CHO + Gln | CD OPTiCHO + FeedB + TNF |
| pVA4-00077 | KO2 | DHODH G202A | CD CHO + Uri + Gln | CD OPTiCHO + FeedB |
| pVA4-00077 | KO19 | DHODH G202A | CD CHO + Uri + Gln | CD OPTiCHO + FeedB |
| pVA4-00077 | 9E4WT | DHODH G202A | CD CHO + Gln | CD OPToCHO + FeedB + TNF |

MSX: L-methionine sulfoxymine;
Gln: glutamine;
Uri: uridine;
TNF: teriflunomide;
FeedB: commercial Feed For trispecific antibody bicistronic VH and VL vectors:

| Transfection | Cells | Selection marker | Day of transfection medium | Post-transfection selective medium |
|---|---|---|---|---|
| pVA4-00080/ pVA4-00081 | KO2 | GS/ DHODH | CD CHO + Uri + Gln | CD OPTiCHO + FeedB + MSX |
| pVA4-00080/ pVA4-00081 | KO19 | GS/ DHODH | CD CHO + Uri + Gln | CD OPTiCHO + FeedB + MSX |
| pVA4-00080/ pVA4-00081 | 9E4WT | GS/ DHODH | CD CHO + Gln | CD OPTiCHO + FeedB + MSX/ TNF |

MSX: L-methionine sulfoxymine;
Gln: glutamine;
Uri: uridine;
TNF: teriflunomide;
FeedB: commercial Feed 72 hours post transfection, cells were counted with Invitrogen™ Countess™ apparatus and the protein production was boosted with another medium changing. Furthermore, transfected cells viability was measured 3 and 7 days after transfection.

At day 14 post-transfection, the cells were centrifuged at 200 g, 10 min and 25° C. The supernatant was filtered through a 0.22 μm PES filter and the protein titer was measured using Octet apparatus.

The following results were obtained.
a) Lipase

|  | Viability of CHO cells at day 3 | | Viability of CHO cells at day 7 | |
| --- | --- | --- | --- | --- |
|  | Live cells ($10^6$) | Viability (%) | Live cells ($10^6$) | Viability (%) |
| LIPASE DHODH_G202A KO2 | 4.2 | 90 | 5.7 | 94 |
| LIPASE GS KO2 | 2.5 | 80 | 5.9 | 80 |
| LIPASE DHODH_G202A KO19 | 4.4 | 92 | 5.9 | 80 |
| LIPASE GS KO19 | 2.3 | 77 | 5.3 | 85 |
| LIPASE DHODH_G202A 9E4 | 2.8 | 78 | 5.4 | 90 |
| LIPASE GS 9E4 | 3.5 | 76 | 5.9 | 93 |

Figure 5:
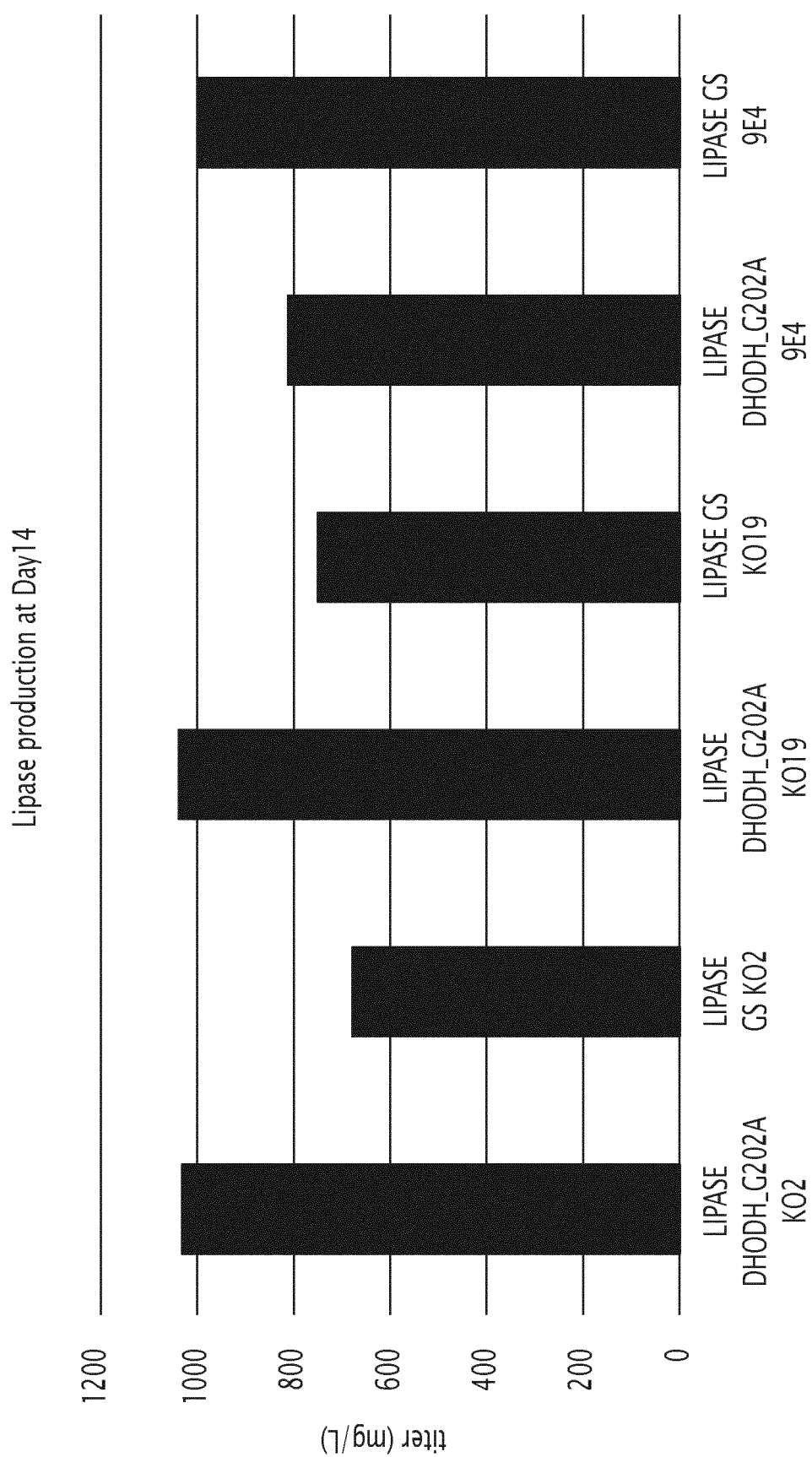
FIG. 5 shows lipase production at day 14 using human DHODH G202A or human GS selection marker and DHODH KO or wild-type CHO cells.

Lipase production at day 14 is shown on FIG. 5.

These results show that both KO DHODH cell lines have the capacity to produce lipase in the absence of teriflunomide selective pressure, which enables decreasing toxicity towards the producing cells.

Furthermore, the KO DHODH cell lines were capable to produce lipase in the same range as the prior art GS system (in wild-type 9E4 CHO cells), i.e. 1 g/l at the 25 ml scale.

b) Monoclonal Antibody mAb-B

|  | Viability of CHO cells at day 3 | | Viability of CHO cells at day 7 | |
| --- | --- | --- | --- | --- |
|  | Live cells ($10^6$) | Viability (%) | Live cells ($10^6$) | Viability (%) |
| mAb-B DHODH_G202A KO2 | 3.2 | 94 | 6.1 | 96 |
| mAb-B GS KO2 | 1.7 | 74 | 4.7 | 88 |
| mAb-B DHODH_G202A KO19 | 4.2 | 95 | 6.5 | 95 |
| mAb-B GS KO19 | 1.9 | 73 | 4 | 85 |
| mAb-B DHODH_G202A 9E4 | 1.5 | 72 | 4.5 | 90 |
| mAb-B GS 9E4 | 2.3 | 76 | 5.3 | 96 |

Figure 6:
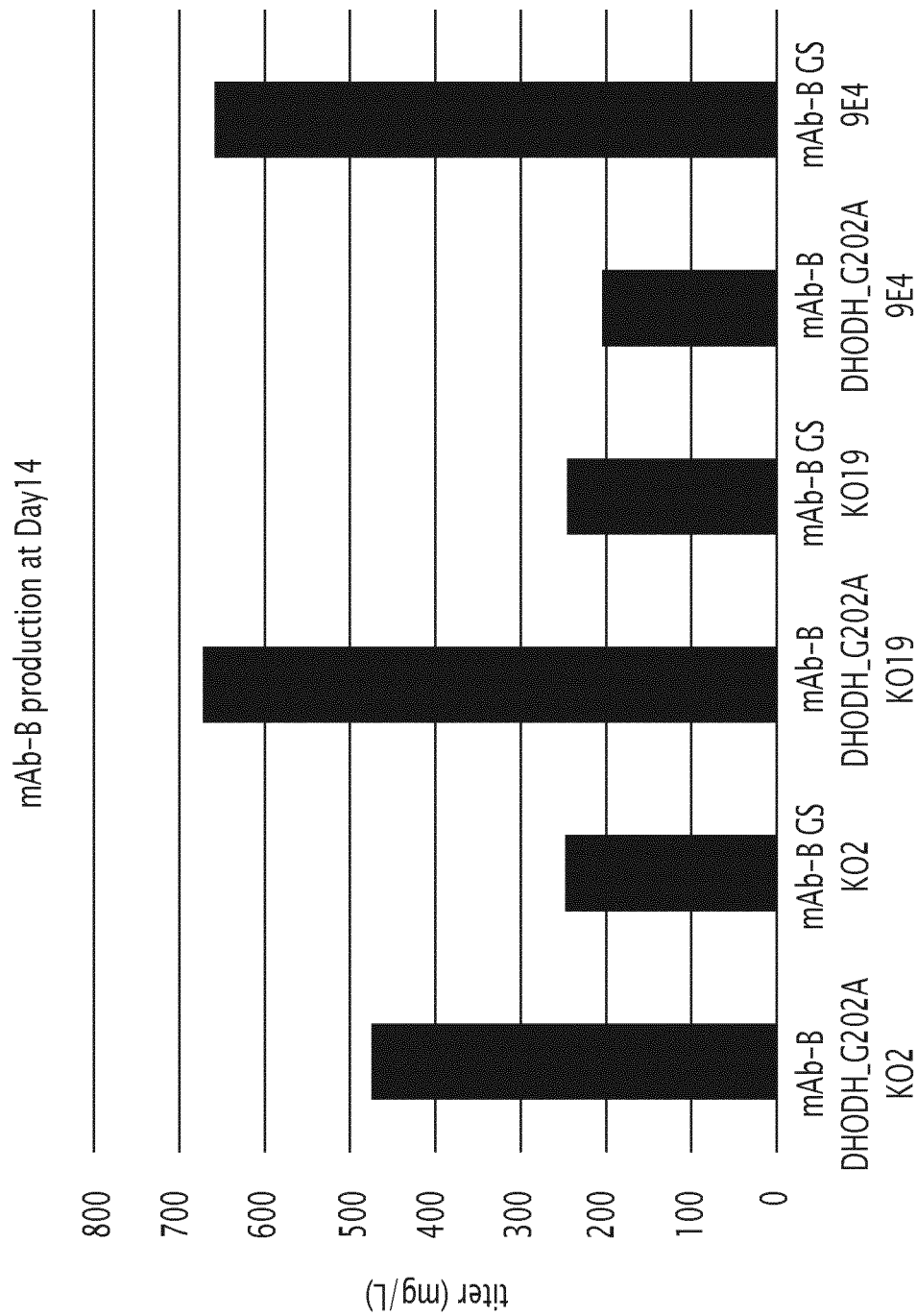
FIG. 6 shows monoclonal antibody, mAb-B, production at day 14 using human DHODH G202A or human GS selection marker and DHODH KO or wild-type CHO cells.

Monoclonal antibody mAb-B production at day 14 is shown on FIG. 6.

These results show that KO DHODH cell lines behaved differently during the production of this particular antibody. Indeed, even if both clones gave a better productivity than the prior art teriflunomide production, the KO19 clone gave a significantly better productivity than the KO2 clone.

In the best KO cell line (KO19), the antibody production was in the same range as the prior art GS system (in wild-type 9E4 CHO cells), around 0.67 g/l at the 25 ml scale.

Furthermore, an increased viability was observed using the KO cell lines.

c) Bispecific Antibody

|  | Viability of CHO cells at day 3 | | Viability of CHO cells at day 7 | |
| --- | --- | --- | --- | --- |
|  | Live cells ($10^6$) | Viability (%) | Live cells ($10^6$) | Viability (%) |
| Bispe GS/ DHODH_G202A KO2 | 2.4 | 80 | 5.3 | 91 |
| Bispe GS/ DHODH_G202A KO19 | 2.5 | 84 | 5.4 | 92 |
| Bispe GS/ DHODH_G202A 9E4 | 1.9 | 69 | 4.1 | 90 |
| Bispe DHODH_G202A/ DHODH_G202A KO2 | 1.5 | 84 | 4.5 | 94 |
| Bispe DHODH_G202A/ DHODH_G202A KO19 | 1.6 | 86 | 4.8 | 95 |
| Bispe DHODH_G202A/ DHODH_G202A 9E4 | 1.6 | 72 | 5.1 | 91 |
| Bispe DHODH_G202A KO2 | 1.7 | 85 | 4.8 | 94 |
| Bispe DHODH_G202A KO19 | 1.8 | 90 | 4.9 | 95 |
| Bispe DHODH_G202A 9E4 | 1.5 | 68 | 4.5 | 91 |

Figure 7:
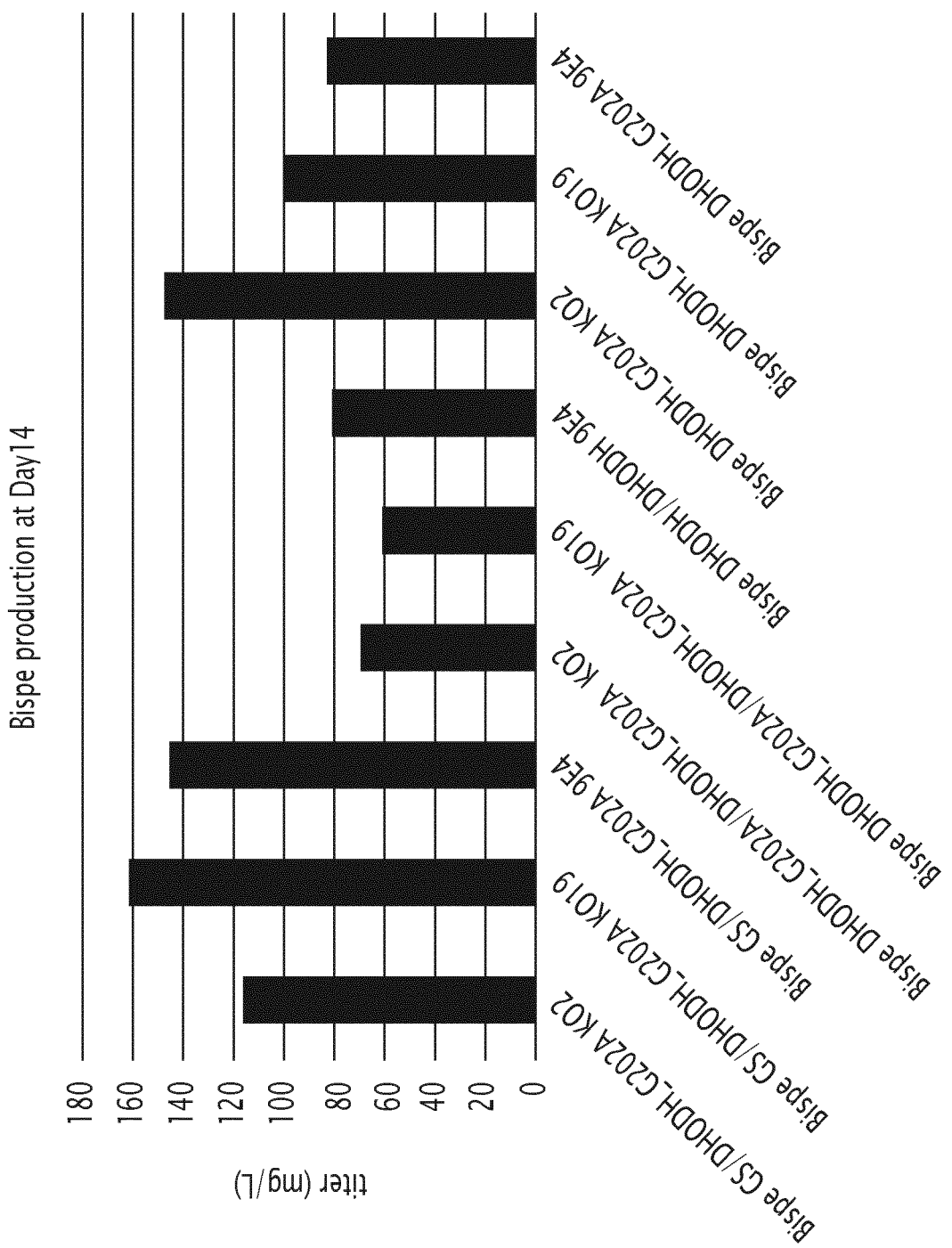
FIG. 7 shows bispecific antibody production at day 14 using human DHODH G202A and/or human GS selection marker and DHODH KO or wild-type CHO cells.

Bispecific antibody production at day 14 is shown on FIG. 7.

Bispecific antibody was not as efficiently produced as monospecific antibodies, in all tested cases. However, despite the difficulties to produce this kind of bispecific antibodies, the productivities of the best KO cell line were in the same range as the prior art GS system (in wild-type 9E4 CHO cells), around 0.145 g/l at 25 ml scale.

Furthermore, an increased viability was observed using the KO cell lines.

d) Trispecific Antibody

|  | Viability of CHO cells at day 3 | | Viability of CHO cells at day 7 | |
| --- | --- | --- | --- | --- |
|  | Live cells ($10^6$) | Viability (%) | Live cells ($10^6$) | Viability (%) |
| Trispe GS/ DHODH_G202A KO2 | 2.8 | 78 | 5.7 | 90 |
| Trispe GS/ DHODH_G202A KO19 | 3.7 | 86 | 5.9 | 95 |
| Trispe GS/ DHODH_G202A 9E4 | 2.2 | 67 | 4.6 | 90 |

Figure 8:
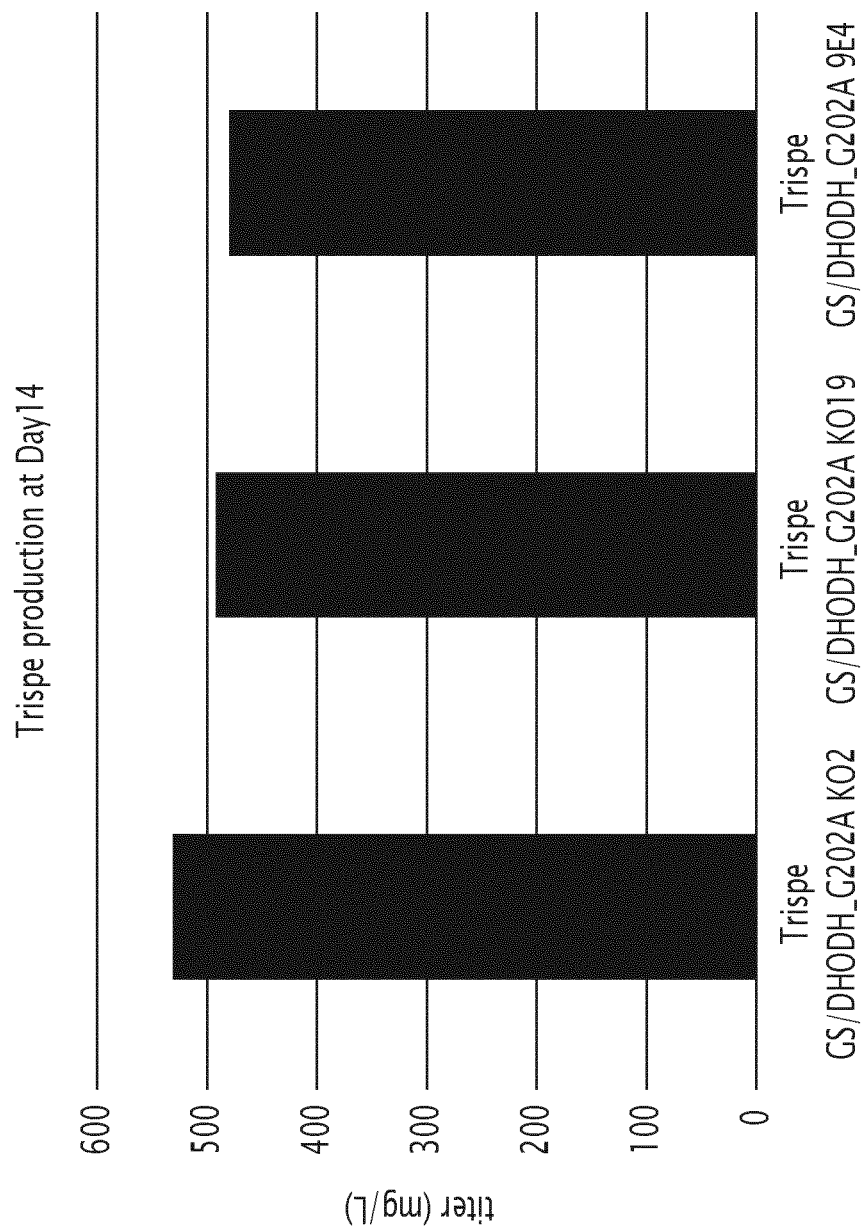
FIG. 8 shows trispecific antibody production at day 14 using human DHODH G202A and human GS selection markers and DHODH KO or wild-type CHO cells.

Trispecific antibody production at day 14 is shown on FIG. 8.

In all conditions, the two KO cell lines gave results in the same range as the prior art selection system, i.e. a remarkable 0.5 g/l.

This example thus confirms that the KO DHODH CHO clones are suitable for expression of various protein formats (proteins, monoclonal antibodies, bispecific antibodies, trispecific antibodies). These clones can even be used for double transfection in order to produce complex proteins.

The invention claimed is:

1. A cell line comprising an endogenous dihydroorotate dehydrogenase (DHODH) gene which is partially or fully inactivated, wherein the cell line is selected from Chinese Hamster Ovary (CHO) cell lines, HEK293, HKB11, PER-C6, HT1080, Daudi, Raji, and CAP cell lines, wherein the cell line further comprises an expression vector comprising a nucleotide sequence encoding an exogenous mammalian DHODH and at least one expression cassette for expressing a recombinant protein.

2. The cell line according to claim 1, which is a CHO cell line.

3. The cell line according to claim 1, wherein the cell line is produced by
   a) inactivating the endogenous DHODH gene in a cell, and
   b) culturing the cell in a culture medium comprising uridine under conditions suitable for generating a cell line in which the endogenous DHODH gene is partially or fully inactivated.

4. The cell line according to claim 3, wherein the endogenous DHODH gene is inactivated by a gene-editing method.

5. The cell line according to claim 4, wherein the endogenous DHODH gene is inactivated by the CRISPR-Cas9 method.

6. The cell line according to claim 1, wherein all the alleles of the endogenous DHODH gene are fully inactivated.

7. The cell line according to claim 1, wherein said exogenous DHODH comprises a sequence at least 60% identical to the sequence SEQ ID NO: 2 or to the sequence SEQ ID NO: 4.

8. The cell line according to claim 7, wherein said nucleotide sequence comprises the sequence of SEQ ID NO: 1 or the sequence of SEQ ID NO: 3.

9. The cell line according to claim 1, wherein said recombinant protein is a monoclonal antibody.

10. The cell line according to claim 1, wherein said vector comprises a first expression cassette suitable for expressing an antibody light chain, and a second expression cassette suitable for expressing an antibody heavy chain.

11. The cell line according to claim 1, wherein the cell line is cultured in a medium devoid of uridine and in the absence of DHODH inhibitors.

12. The cell line according to claim 1, wherein the cell line is maintained without selection pressure from the use of DHODH inhibitors.

13. An expression system comprising
    the cell line according to claim 1,
    the mammalian DHODH comprises a sequence at least 60% identical to the sequence SEQ ID NO: 2 or to the sequence SEQ ID NO: 4.

14. The expression system according to claim 13, wherein said nucleotide sequence comprises the sequence of SEQ ID NO: 1 or the sequence of SEQ ID NO: 3.

15. The expression system according to claim 13, wherein said recombinant protein is a monoclonal antibody.

16. The expression system according to claim 13, wherein said vector comprises a first expression cassette suitable for expressing an antibody light chain, and a second expression cassette suitable for expressing an antibody heavy chain.

17. The expression system according to claim 13, wherein the cell line has been selected without DHODH inhibitors.

18. A kit comprising (i) the cell line according to claim 1, and (ii) a culture medium devoid of uridine.

19. The kit according to claim 18, wherein the kit does not comprise DHODH inhibitors.

20. An in vitro method of producing a recombinant protein comprising the steps of:
    A) providing a cell line according to claim 1;
    B) culturing said cell line under conditions suitable for production of the recombinant protein; and
    C) isolating and/or purifying said recombinant protein.

21. The method according to claim 20, wherein step B) is conducted in a culture medium devoid of uridine, in particular further devoid of DHODH inhibitor.

22. The method according to claim 20, further comprising a step D) of formulating said recombinant protein into a pharmaceutical composition.

23. The in vitro method of claim 20, wherein the cell line is cultured in the absence of DHODH inhibitors.

* * * * *

SEQUENCE LISTING

<160> NUMBER OF SEQ ID NOS: 45

<210> SEQ ID NO 1
<211> LENGTH: 1188
<212> TYPE: DNA
<213> ORGANISM: Cricetus cricetus

<400> SEQUENCE: 1

| | | |
|---|---|---|
| atggcttggc ggcagatgcg gaagagagcc ctggacgccg ctatcatcct gggaggcgga | 60 |
| ggcctgctgt tcacctctta cctgacagcc accggcgacg accacttcta cgccgagtac | 120 |
| ctgatgcctg ccctgcagag actgctggac cctgagtctg cccaccggct ggccatcaga | 180 |
| ttcacctccc tgggcctgct gcccagagcc accttccagg actccgacat gctggaagtg | 240 |
| cgggtgctgg gccacaagtt cagaaacccc gtgggaatcg ccgctggctt cgacaagcac | 300 |
| ggcgaggctg tggacggcct gtacaagctg gcttcggct cgtggaagt gggctccgtg | 360 |
| acaccccagc cccaggaagg caaccccaga cctagagtgt tccggctgcc tgaggaccag | 420 |
| gccgtgatca acagatacgg cttcaactcc cacggcctgt ccgtggtgga caccggctg | 480 |
| agagccagac agcagaagca gaacaagctg accgccgacg gcctgcccct gggcatcaat | 540 |
| ctgggcaaga caagacctc cgaggacgct gccgccgact acgtggaagg cgtgcgagtg | 600 |
| ctgggaccte tggccgatta cctggtcgtg aacgtgtcct cccccaacac cgctggcctg | 660 |
| agaagcctgc agggaaaggc cgagctgaga aggctgctgg ccaaggtgct gcaggaacgg | 720 |
| gacgctctga agggcgccca gaaacctgcc gtgctcgtga gatcgcccc tgacctgacc | 780 |
| gcccaggaca agaggatat cgcctccgtg gccagagagc tgggcatcga cggactgatc | 840 |
| gtgaccaaca ccaccgtgtc tcggcctacc ggactgcagg gcgctctgag atctgagatg | 900 |
| ggcggcctgt ctggcaagcc tctgagggac ctgtccaccc agaccatcag agagatgtac | 960 |
| accctgaccc agggccggat ccccatcatt ggagtgggcg gagtgtcctc tggccaggac | 1020 |
| gccctggaaa agatccaggc tggcgcctct ctggtgcagc tgtataccgc cctgaccttt | 1080 |
| ctgggccctc ccgtggtggt gcgagtgaag agagaactgg aagccctgct gaaagagcgg | 1140 |
| ggcttcaaca ccgtgaccga ggccatcggc gctgaccaca agatgga | 1188 |

<210> SEQ ID NO 2
<211> LENGTH: 395
<212> TYPE: PRT
<213> ORGANISM: Cricetus cricetus

<400> SEQUENCE: 2

Met Ala Trp Arg Gln Met Arg Lys Arg Ala Leu Asp Ala Ala Ile Ile
1               5                   10                  15

Leu Gly Gly Gly Gly Leu Leu Phe Thr Ser Tyr Leu Thr Ala Thr Gly
            20                  25                  30

Asp Asp His Phe Tyr Ala Glu Tyr Leu Met Pro Ala Leu Gln Arg Leu
        35                  40                  45

Leu Asp Pro Glu Ser Ala His Arg Leu Ala Ile Arg Phe Thr Ser Leu
    50                  55                  60

Gly Leu Leu Pro Arg Ala Thr Phe Gln Asp Ser Asp Met Leu Glu Val
65                  70                  75                  80

Arg Val Leu Gly His Lys Phe Arg Asn Pro Val Gly Ile Ala Ala Gly
                85                  90                  95

Phe Asp Lys His Gly Glu Ala Val Asp Gly Leu Tyr Lys Leu Gly Phe
            100                 105                 110

| | | | | | | | | | | | |
|---|---|---|---|---|---|---|---|---|---|---|---|
|Gly|Phe|Val|Glu|Val|Gly|Ser|Val|Thr|Pro|Gln|Pro|Gln|Glu|Gly|Asn|
| |115| | | | |120| | | | |125| | | | |

Pro Arg Pro Arg Val Phe Arg Leu Pro Glu Asp Gln Ala Val Ile Asn
130 135 140

Arg Tyr Gly Phe Asn Ser His Gly Leu Ser Val Val Glu His Arg Leu
145 150 155 160

Arg Ala Arg Gln Gln Lys Gln Asn Lys Leu Thr Ala Asp Gly Leu Pro
165 170 175

Leu Gly Ile Asn Leu Gly Lys Asn Lys Thr Ser Glu Asp Ala Ala Ala
180 185 190

Asp Tyr Val Glu Gly Val Arg Val Leu Gly Pro Leu Ala Asp Tyr Leu
195 200 205

Val Val Asn Val Ser Ser Pro Asn Thr Ala Gly Leu Arg Ser Leu Gln
210 215 220

Gly Lys Ala Glu Leu Arg Arg Leu Leu Ala Lys Val Leu Gln Glu Arg
225 230 235 240

Asp Ala Leu Lys Gly Ala Gln Lys Pro Ala Val Leu Val Lys Ile Ala
245 250 255

Pro Asp Leu Thr Ala Gln Asp Lys Glu Asp Ile Ala Ser Val Ala Arg
260 265 270

Glu Leu Gly Ile Asp Gly Leu Ile Val Thr Asn Thr Thr Val Ser Arg
275 280 285

Pro Thr Gly Leu Gln Gly Ala Leu Arg Ser Glu Met Gly Gly Leu Ser
290 295 300

Gly Lys Pro Leu Arg Asp Leu Ser Thr Gln Thr Ile Arg Glu Met Tyr
305 310 315 320

Thr Leu Thr Gln Gly Arg Ile Pro Ile Ile Gly Val Gly Gly Val Ser
325 330 335

Ser Gly Gln Asp Ala Leu Glu Lys Ile Gln Ala Gly Ala Ser Leu Val
340 345 350

Gln Leu Tyr Thr Ala Leu Thr Phe Leu Gly Pro Pro Val Val Val Arg
355 360 365

Val Lys Arg Glu Leu Glu Ala Leu Leu Lys Glu Arg Gly Phe Asn Thr
370 375 380

Val Thr Glu Ala Ile Gly Ala Asp His Arg Arg
385 390 395

<210> SEQ ID NO 3
<211> LENGTH: 1188
<212> TYPE: DNA
<213> ORGANISM: Homo sapiens

<400> SEQUENCE: 3

```
atggcttggc ggcacctgaa gaagagggcc caggacgccg tgatcatcct gggaggcgga      60
ggcctgctgt cgcctcttta cctgatggct accggcgacg agcggttcta cgccgagcat     120
ctgatgccca cactgcaggg cctgctggac cctgagtctg cccatagact ggccgtgcgg     180
ttcacctccc tgggactgct gcctagagcc cggttccagg actccgacat gctggaagtg     240
cgggtgctgg ccacaagtt cagaaacccc gtgggaatcg ccgctggctt cgacaagcac     300
ggcgaggctg tggacggcct gtacaagatg ggcttcggct tcgtggaaat cggctccgtg     360
acccccaagc cccaggaagg caaccccaga cctcgggtgt tcagactgcc tgaggaccag     420
gctgtgatca acagatacgg cttcaactcc cacggcctgt ccgtggtgga acaccggctg     480
agagccagac agcagaagca ggccaagctg accgaggatg gcctgcctct gggagtgaac     540
```

```
ctgggcaaga caagacctc cgtggacgcc gccgaggatt acgctgaagg cgtgcgagtg      600
ctgggacccc tggctgatta cctggtcgtg aacgtgtcct cccccaacac cgctggcctg      660
agatctctgc agggcaaggc cgagctgcgg agactgctga caaaggtgct gcaggaacgc      720
gacggcctgc ggagagtgca tagacctgcc gtgctcgtga agatcgcccc cgacctgacc      780
agccaggaca agaggatat cgcctccgtc gtgaaagagc tgggcatcga cggactgatc      840
gtgaccaaca ccaccgtgtc taggcctgcc ggactgcagg ggctctgag atctgaaacc      900 ggcggactgt ccggcaagcc tctgagggat ctgtccaccc agaccatcag agagatgtac      960
gccctgaccc agggccgggt gccaatcatt ggagtgggcg agtgtcctc cggccaggat     1020 gccctggaaa agatcagagc cggcgcttcc ctggtgcagc tgtacaccgc tctgacctttt     1080 tggggccctc ccgtcgtggg caaagtgaag agagagctgg aagccctgct gaaagagcag     1140
ggatttggcg gcgtgaccga tgccatcggc gctgaccaca agatga                   1188
```

<210> SEQ ID NO 4
<211> LENGTH: 395
<212> TYPE: PRT
<213> ORGANISM: Homo sapiens

<400> SEQUENCE: 4

```
Met Ala Trp Arg His Leu Lys Lys Arg Ala Gln Asp Ala Val Ile Ile
1               5                   10                  15

Leu Gly Gly Gly Gly Leu Leu Phe Ala Ser Tyr Leu Met Ala Thr Gly
                20                  25                  30

Asp Glu Arg Phe Tyr Ala Glu His Leu Met Pro Thr Leu Gln Gly Leu
            35                  40                  45

Leu Asp Pro Glu Ser Ala His Arg Leu Ala Val Arg Phe Thr Ser Leu
        50                  55                  60

Gly Leu Leu Pro Arg Ala Arg Phe Gln Asp Ser Asp Met Leu Glu Val
65                  70                  75                  80

Arg Val Leu Gly His Lys Phe Arg Asn Pro Val Gly Ile Ala Ala Gly
                85                  90                  95

Phe Asp Lys His Gly Glu Ala Val Asp Gly Leu Tyr Lys Met Gly Phe
            100                 105                 110

Gly Phe Val Glu Ile Gly Ser Val Thr Pro Lys Pro Gln Glu Gly Asn
        115                 120                 125

Pro Arg Pro Arg Val Phe Arg Leu Pro Glu Asp Gln Ala Val Ile Asn
130                 135                 140

Arg Tyr Gly Phe Asn Ser His Gly Leu Ser Val Val Glu His Arg Leu
145                 150                 155                 160

Arg Ala Arg Gln Gln Lys Gln Ala Lys Leu Thr Glu Asp Gly Leu Pro
                165                 170                 175

Leu Gly Val Asn Leu Gly Lys Asn Lys Thr Ser Val Asp Ala Ala Glu
            180                 185                 190

Asp Tyr Ala Glu Gly Val Arg Val Leu Gly Pro Leu Ala Asp Tyr Leu
        195                 200                 205

Val Val Asn Val Ser Ser Pro Asn Thr Ala Gly Leu Arg Ser Leu Gln
    210                 215                 220

Gly Lys Ala Glu Leu Arg Arg Leu Leu Thr Lys Val Leu Gln Glu Arg
225                 230                 235                 240

Asp Gly Leu Arg Arg Val His Arg Pro Ala Val Leu Val Lys Ile Ala
                245                 250                 255
```

```
Pro Asp Leu Thr Ser Gln Asp Lys Glu Asp Ile Ala Ser Val Val Lys
            260                 265                 270

Glu Leu Gly Ile Asp Gly Leu Ile Val Thr Asn Thr Thr Val Ser Arg
        275                 280                 285

Pro Ala Gly Leu Gln Gly Ala Leu Arg Ser Glu Thr Gly Gly Leu Ser
    290                 295                 300

Gly Lys Pro Leu Arg Asp Leu Ser Thr Gln Thr Ile Arg Glu Met Tyr
305                 310                 315                 320

Ala Leu Thr Gln Gly Arg Val Pro Ile Ile Gly Val Gly Gly Val Ser
                325                 330                 335

Ser Gly Gln Asp Ala Leu Glu Lys Ile Arg Ala Gly Ala Ser Leu Val
            340                 345                 350

Gln Leu Tyr Thr Ala Leu Thr Phe Trp Gly Pro Pro Val Val Gly Lys
        355                 360                 365

Val Lys Arg Glu Leu Glu Ala Leu Leu Lys Glu Gln Gly Phe Gly Gly
    370                 375                 380

Val Thr Asp Ala Ile Gly Ala Asp His Arg Arg
385                 390                 395
```

<210> SEQ ID NO 5
<211> LENGTH: 20
<212> TYPE: DNA
<213> ORGANISM: Artificial Sequence
<220> FEATURE:
<223> OTHER INFORMATION: corresponding piece of DNA for generating gRNA

<400> SEQUENCE: 5
ggatgcagcc atcatccttg                                                 20

<210> SEQ ID NO 6
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence1)

<400> SEQUENCE: 6
caccgggatg cagccatcat ccttg                                           25

<210> SEQ ID NO 7
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence1)

<400> SEQUENCE: 7
aaaaccaagg atgatggctg catcc                                           25

<210> SEQ ID NO 8
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence2)

<400> SEQUENCE: 8
caccggatgc agccatcatc cttgg                                           25

```
<210> SEQ ID NO 9
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence2)

<400> SEQUENCE: 9
aaaacccaag gatgatggct gcatc                                           25

<210> SEQ ID NO 10
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence3)

<400> SEQUENCE: 10
caccggcagc catcatcctt ggggg                                           25

<210> SEQ ID NO 11
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence3)

<400> SEQUENCE: 11
aaaacccccc aaggatgatg gctgc                                           25

<210> SEQ ID NO 12
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence4)

<400> SEQUENCE: 12
caccggccat catccttggg ggagg                                           25

<210> SEQ ID NO 13
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence4)

<400> SEQUENCE: 13
aaaaccctcc cccaaggatg atggc                                           25

<210> SEQ ID NO 14
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence5)

<400> SEQUENCE: 14
caccggctat tcgcttcacg tccct                                           25

<210> SEQ ID NO 15
```

```
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence5)

<400> SEQUENCE: 15
aaaacaggga cgtgaagcga atagc                                        25

<210> SEQ ID NO 16
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence6)

<400> SEQUENCE: 16
caccggcctc tacaaactgg gcttt                                        25

<210> SEQ ID NO 17
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence6)

<400> SEQUENCE: 17
aaaacaaagc ccagtttgta gaggc                                        25

<210> SEQ ID NO 18
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence7)

<400> SEQUENCE: 18
caccgggctt tgggtttgtc gaggt                                        25

<210> SEQ ID NO 19
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence7)

<400> SEQUENCE: 19
aaaacacctc gacaaaccca aagcc                                        25

<210> SEQ ID NO 20
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence8)

<400> SEQUENCE: 20
caccggctgg tctgaggagc ctaca                                        25

<210> SEQ ID NO 21
<211> LENGTH: 25
```

```
<212> TYPE: DNA
<213> ORGANISM: Artificial Sequence
<220> FEATURE:
<223> OTHER INFORMATION: oligonucleotide used for obtaining gRNA
      (Sequence8)

<400> SEQUENCE: 21
aaaactgtag gctcctcaga ccagc                                          25

<210> SEQ ID NO 22
<211> LENGTH: 14437
<212> TYPE: DNA
<213> ORGANISM: Cricetulus griseus
<220> FEATURE:
<221> NAME/KEY: misc_feature
<222> LOCATION: (1992)..(2015)
<223> OTHER INFORMATION: target of plasmids pBH6840 KO DHODH SEQ1 and
      pBH6841 KO DHODH SEQ4
<220> FEATURE:
<221> NAME/KEY: misc_feature
<222> LOCATION: (2129)..(2147)
<223> OTHER INFORMATION: target of plasmid pBH6842 KO DHODH SEQ5
<220> FEATURE:
<221> NAME/KEY: misc_feature
<222> LOCATION: (4015)..(4047)
<223> OTHER INFORMATION: target of plasmid pBH6843 KO DHODH SEQ7

<400> SEQUENCE: 22
ccgagcccac attctccaat ggagtggagg cagaggcggg cccagtggca gaaggagcat      60
ggcgtggaga cagatgagag tgagtctgtt gcgggtgctt acgcttgttc ggaaaacagg     120
ttgggagtgg acgaggctgg gagattgaaa ggctggggcc cttgcagtgt gggctgcatg     180
tgtgctcagc taggggcatg caaaaagcaa gcgtgctggg cagaggctga gttgattgtg     240
agagatcgcg ggcttttttt ttttttttt tcttaaactg agctagtatc gggcccctgt      300
gagcacatgg tggctagcat tatggaaagg atccagggcg gaatgaaata agacacgcag     360
ccacccttcc agataaagtg tggttagaat gggagtcccg tgcgaagagt ccgtagattg     420
tgtccctggc ttgggaaaga gtgcgcagat attgtttctt gacacgtgag aatttctccc     480
tccagaggag ggagaatgaa tacttggttt gctgtacagg caaatctgat cacatcctct     540
acttccttat ttagtggaca atcccatta aaaatataat cactgattgt ggtgaggggt      600
tgtgctgtga catgggagct ggaaccgaac tctgcactta accactgaac catctccagc     660
ccccaaatct gtattttggc tgacaccccc acatttctcc taccttactt taagaaatgc     720 tttccttta gttccaaaca gacctgtctt cctctacccc attctctggc ccttctcatt      780
ggcttcagcc acctagagat tccttctcca gctgcttcct cctctttagc ttttgtgtct     840
ccttggaaag tcaaccttag cctggaagga gcctcaagat ccttccatta cttatctctt     900
cgtgtcagtt tcttgggtt tgtgtttaca tggccattaa tttctctctt cattagatag      960
attacacact tctgaaggac agggacctgg tgtggtttgc ttgcctttgg tgaaggattg    1020
aatgaatgca ttagccactt ggcatctggc agtgataatt atcaaaaagc attgtgagcc    1080
tcctttgaac tagggtagtg attctctacc cagagtgtga agctatgttt gtattacaac    1140 cactttata ttatacacat aggacatttc aggccagtaa cttttctagg tataatttta     1200
aaatatagac accatgtcct aactacagta taaggagaa atgaaaacat gtatttcagt     1260
atgtagaagt cagaacacag ttcacctaca tagatggcca ggtgtttaag cctctattta    1320
gaaggtgtgc gttggtatac aaacagcact gtataccctt tctggtgggg ttttaggaac    1380
agtgaccaag tcttagtaat gttttgtgca aactgtacaa ttgtccttaa attacaaggt    1440
```

```
atctttatttt ctgtaaaagt caccctgtac atgtaaacca tgtggttgtg tggtgaacta   1500
tagcttgctt cttgcctctc ctattatcct cagataatag gaagttttcc tcacataaat   1560
agcaatagca agttcaaaca tcatacagta catagggaaa ctagtgtgtt agctttaatt   1620
aaagaagaat attgacagga ctgatttctc cacaccaaat gtattagcat cattccctca   1680
ttaactagta aaattttcc catgtgaccc ctagggggca gtactgcctg tcttgaaaat    1740
tccctgcctg gtccttagga aaatattcag ggctagaacc catgtaagca gtgtaggtac   1800
tgcatctacc tttgtagatg tgtaagtggg caggatatga aggggacag tgtgagcagg    1860 gaaggactgt cactttgtgt agttgttatg tcctctgggc aggtgtgaag ggtcaggaag   1920
ggtactgcag gctggtctga tggggttccc catggggcct tttctctccc ccactagaag   1980
cgggccctgg atgcagccat catccttggg ggaggaggac ttctcttcac ctcttacctg   2040
acagccacgg gcgatgacca tttctatgct gaatatctga tgccggccct gcagaggctg   2100
ctagacccag aatcagccca ccggctagct attcgcttca cgtccctggg gctccttcct   2160
cgagctacat ttcaggactc tgacatgctg gtaggtcccc cggtcaccct gtgttacatt   2220
tgtgtttgta ggggaggtca catccttcag cacttcggta ttcctctgct gccactgggc   2280
ttttgaaaac cagagctgca ggttcacaag cagctgggac ctggagccca gcccgaggaa   2340
gggacttttc ttctgtgtta cccctgtac ttacagaaca gcactcagca tatagccggt    2400
gcttacagct ttaatcctca cagatacctt ttgagggagg tcctatctca tctccatcta   2460
caaatcagga aactgaggta cagactaagt aagtgacttg cccaaggtca cacagctggg   2520
aggtggcagg accaggattc aaacctatag agtttgactc cagtgtccaa ccttggtcac   2580
tggcctgcct tgctgagatc cctctgctga acaggaacat cttctggagt cattaagcag   2640
ctactggatg caggggacag ggtcagcagg gaagggctgt cacttgtaga tactgtgtcc   2700
tctgtctgga taggtgtgaa gtctcagagt gggtgctgca gcctggcctg atgggtccgt   2760
cctttccccc catcagaagc agaccctggc tgtagtcatc ccctgaggg gtggaggact    2820 taagtcctag gcaacctcct gccccagcca cattcagcca caactcactc ctgtggccca   2880
cctggcacca tttataacag agccagtgtg gcccttctac tgtctctctg aatgctcccc   2940
ttttgagatg ggcctaggtt gtccaggttg gtctcaaact tggggtccca aatgatttca   3000
gaatctcagc ttcctgagta agtgggatca cacagtatgc accactgtgc gcagtggtcc   3060
ctgttccccg atagccaggc cggttgatac tcttagcccg attcacctttt ctcggttttc   3120 taagtcttca gttttctatc atgacgagac tctcctgggg gaggggatg gctgggtgct    3180 tctggaatgc ttggctgacc cggtctcctg attgaccggt tttaccataa tctcaaagaa   3240
gcctgacatc aacaccccag gctctgtcac acagccaggg atgagaactg gcttgagggt   3300
agcctcaagg aaggcctgtt ctagctgaac ttctcgcctc atggttatga agtgctgcgt   3360
gcacattttt accttccttg tgctcattct cgtctcctgt ggattttgag agcatgtagc   3420
tttccccttg gggactggcc tctaagagct cactggcagc accattgcct gccagtgtcc   3480
acccttcagc tctccatggt gcccatgggc tggcttcttg acagttatgg aggaagggcc   3540
agctagggct tgtatgctag gctggctaca ggctacctca aggctggtga caccaaggac   3600
tccttctcct gcccaggttg agtagatagg aagatacaca gtaattgtgc aagacagcac   3660
ctgtctcctc ttcacttgtg gtgggacact atctttctct ccccactgcc ttgagacccc   3720
ctggtgacag actccagcag acatcagaag cacctgcaga atgctgatgc agatagatac   3780
cccagggtgt ccttcctccc aaagatccct attttctggg cccagtgatg cttagcaagc   3840
```

```
tccagggaa ttcttataca gtatgctggg atccctgctg tgagaaccac ttggtatagc    3900
tgcttatacc tctgacctgt ctccttccca ggaagtgaga gtcctgggcc ataaattccg    3960
aaatccggta gggattgctg cgggatttga caagcacggg gaagctgtag atggcctcta    4020
caaactgggc tttgggtttg tcgaggtagg aagtgtgact ccccagcctc aggaaggaaa    4080
ccccagaccc agagtgttcc gcctcccgga ggaccaagct gtcattaaca ggtaggtggt    4140
ggctcaatgt catagggaca tctcctcccc tgctgggatc tctgagatgg aacctgtttt    4200
gtgcttttct catatgatca gtggacagtc tgtcctttgg gatagtcagg agcacctttg    4260
aacacctgtt gtgtactagg cagctctcgc cccaaccttg ggaaacagct gttaggattt    4320
taccaggtat tcccactgag gctctgagag ctggtgctgg ttgcaaagaa cagcttggga    4380
aggcttgggc tgttgggctt cagtgtgagc ttttttacat tgttgctcta ttgcctttgt    4440
ccaatgttgg ctaacaggaa tataatgatc tcacatgtaa tttgaaatat tctaatgatg    4500
cattaaaaac tagtgaactt gataatacat ttataattat tatattttta attattatga    4560
tttaattata aacagtgtgt tctaaagtca ttttaacctg cagtcaatgt aaaaatcatt    4620
ggttaactat cgtcctcttt ttattggttt ccggtccccc aatgccttta cttctggttc    4680
ctctcacttg gccagggctg gtggccacaa gcttcagcag cgttggtact gtacaggtga    4740
cccttgcttt caatgaacag ggacatggta ttcaaatgta cagctgctct taggaggaga    4800
atccttcgac tgtatgaagc cttgcggttt gttgttctgt atagttagta taactgcaaa    4860
gggaagacct tcgtactttt tgctaggaga ttttggaga acctccttgt ggggattttg    4920
gcaggcctgt ggcagtgctt cctactgctt gtttcaggaa actgatttac aagtcataga    4980
tctttctgtt acattacagg cagggactga tgtcttagg actggccaga caaaatactt    5040
gtgtttctga tttggctgtt acaagtgact tcgggtctta ggatgatggt acttgggaca    5100
gggagtggtg agggacaggc acctgtgctc ttgggcatgt gcgaacttag ccttcttgct    5160
catatacaca gtgtgtgttc agtataggca tgctaacgga tgggtattta cacctgcaga    5220
cccacatgcc acaatccatg cagtgttgct ctggctgcaa gcaacaaagt gatgtaacca    5280
gatctcattt gttatcattc ttgtcactag cacaaaataa ctgacagcag gcagcttaag    5340
gaatggggtc aggtattttg gctcacagtt tgaggggaca cgccctcccg gtggcaggag    5400
cctgaggcag agggtcactc tgtacctaca gtgaggaagc agcaagggaa ggatgctggt    5460
gcttgggtct cttttctccgt cttgctcagc tggggtgtga atccatggtg ctgcccatgt    5520
ttgcggtggg tcttccctgc tccattcaac cttcccagaa acagtcttcc agacacacaa    5580
caggtgtgtt tccatggtga ctctaagtca catctagttg acaatgaagc ataaccagtg    5640
gtgagagcat ggaaatggtc tcaggtacgt tttccaaact gccacctttt aattccaccc    5700
cttacctgtg ggtttatgtg ctccaggtac ggattcaaca gccacgggct ctcagtggtg    5760
gaacacaggc tacgggccag acagcagaag cagaacaagc tcactgcagg taaactcagg    5820
tgttgtggga gggacttact aactctatta caaagaaaca tggggagggc atgggattca    5880
gcaataagaa acaaatgagc aaacaattaa aaccccacag aacaactcag gggattgtcc    5940
agcttctacc acagcctcaa aggtctcaac cagatggcat aattcagcaa aaccttgctg    6000
gtctctggca tccatggaac ctgaattgtg tcttaactta ggggcttgaa gatcagcaga    6060
gagcatgtgt ggagctaaga tgcgcccga gttcatcttc ccacatcccg ccctgctgct    6120
gtccttctgt tcactgtgta aatagtgtgt attagttctg gaagagctac agaagagaat    6180
```

```
agagttgtca cactcctgtc cttccactca ggggaccagc tgtcctcaaa tctcacttcg   6240
gaaacaacct ttgcttttgg tggattctca tggagacgct ccagtttgtc ctctgtggtc   6300
tgcatggctc tctgaagtgc attttgtggt caaagccctg ggtggtggcc ccctcccca    6360 tgtctccctg tgtggcttct gcagtccatg gagattttc tcctttgcct ctggaatgtc    6420
tttcaggagg tcttagtctc atttgatgtc cccatagtgt gacaattaag ccaaggactt   6480
ctgcatttat ttgaggagct aaggaagaga gggctgaagc atttgacgag tttagagggt   6540
gggaacagga aatgacaatg tttaaaaaaa cccctggttt tgacggaacc gggtctgcca   6600
gccctgtaga accttgaaca caatgtttgt ggtttgtggc gttctcctgc ctcctgcctt   6660
ccgtttcttc gttttaatgc cttctgtggg ctaggtttat tgccattgtc ctgtgtccac   6720
ccttcatcct cattctgtgc cctcacagtc actggagtga ggccaagttc tgtgtctttg   6780
ccctgcctac atgtgtctgc tgacagctag cagcctcata gaaacttttc atcagcacca   6840
tgcctaggaa ccctagtgga tagaagagac tgtgctttgt gtaaagtgta gttcagcctt   6900
cctgactcca gaactgtgac tgtgggcagg tgaccactaa tgaaaggctc agttgcctct   6960
tggaagccat actctcaatc cagtttactt gtgctaaagc ttacagtgat cctggcttgc   7020
tgggtgctag acttgaagct ttgagacctt gttctgtata tagtctaatc cctggctcca   7080
cccagcccac ttaggaaatt agttacacaa atcttacttt taagttgatg acccagaaga   7140
tgacgggttg tgagagatgg actgtgagaa ggggctagc aatacagtgg gggatgttgc    7200
ccgtgtcctc cctggcctgg tatgggtgag ctgacttggt gttctaggtc tggctggatt   7260
ggcagatgga cagcagcctg ggccactgac atactaggag ttgtaagaaa gttgagttgt   7320
aataaagatg aatccaggaa actccttcct gccaaagaga acatgagtct gaaagagcat   7380 tttctagag gcttggcctt ttgagagtga caggggcag gtgtgagtaa ttacacccag     7440
gccccaggag tgtcttgagg ctacagagat gtatcatcac cctaattata agttcttttc   7500
tcagagaaca agaagatt attacacact tccatctact ttttaggcat gatagttgaa     7560
aacatttcct agtgttttcc tgtgtagctc aggctggcct cagacttaca gcaatcctcc   7620
tgcagactaa atttccatgt gtggcctcca gtgttttata cttttgtttt taatcatttc   7680
acatacagtc ccttgaccaa ggctcatgag attcaggttg ttcttgctga catgcccatc   7740
aatacctgcc tactctctct tttgttatct ctcaaaccac tgatctgtga atatagcaag   7800
tgtcattggg agtcatttta ttgctacata cttcaagaag agcagtagta tttgtttttt   7860
tccccatgtc cctgatttgt ctggactcag atccttggcc acccatgcag tcagtgttgg   7920
ggatgggttc catctcatgg attgggcctt aaatacaatc agattctggt tggttactcc   7980
cgcagctttg tgctactgtt tcactagtgc atccagggca ggtcatcatt gtagatcaaa   8040
agatgtgtag cgggggttggt gtttaccttt ctcctttggt aacatgcaga ataccctcca   8100
gtaccatgga caccaccaga gggatgaagg ctgtaggtag gcaccagctc gacttctccc   8160
tatttaataa cttgtgtagg tgttgtcttt agcaatagaa ccttgtcagt tttcagagag   8220
caaccaatat ccttgacaat agcctggggt gtttgggtat tctcatgggg cccctttggc   8280
caacaacttc tttgaaagtc tggtcaaatt cttcactaaa accatctggc actgggcatt   8340
ttttggttgg gaggctttta tgactgcttc tattttacta ggggttataa gtttgtttac   8400
attgcttatc cgatcttgat ttaactttag tagatggtat gtatcaagaa aattattcat   8460
ttattttcaa ttttccattt aggtagagta taggttttta aaacacatcc ctatgattct   8520
ttggatttcc ttggtgtctg ttgttatgtc actcttttca tctctaattt tgttaatttg   8580
```

```
gatctttcct ctttgccttt taattaattt ggctaagggt ttgtcaatct tactggtttt    8640
ctcaaagaac caactcttcg tttcattgat tctttgcatt attttttgtct gtttctattt    8700 cattgatttc agccctgagt ttgattattt cctgccatct actcctcctg ggtgtgactt    8760
cttgttgttc tagagctttc aggtgtgcta gtatgaaatc tctctaattt atgtaggcac    8820
ttagtgctac ataaagtttt gggttttttgt tttgttttga cctatttttc attcagtagt    8880
gagttgttca gtttcagttg ttcagtttcc atgagtttgt aagctttctg ttgttttttgt    8940 aggtgttgat attcagcttt aatctgtggt ggtatgatag gtattatttt cagttttctt    9000
gtatcttttg agacttgctt tatggcctag tatatggtca gttttggaga aagttccatg    9060
aggtgctgag aagaaacgtt ttgtgtttgg gtgaaatgtt ctataaatta ggtccatttg    9120
gtttaacaca tcatttagct ccatcatttc tttgttcagt ttttgtctgg atgacctgtc    9180
tattgtcgag agttggggag tatcaaagta tcccactatg tgtgtgtgtg tgcggagggg    9240
tcaatatgtg atttaagcta tagtagagtt tcttttatga acttggatgc ctttgtgctt    9300
ggtgcataga tgtttagaat ttcaatatcc tcttggtggg ttttttccttt gatgagtatg    9360 tagtttcctt ccctatctat ctcttgatta gatttgattt gaaatctatt ctgtcatata    9420
ttaaaatggc ttcacccatt tgctttcttg tccatttgct tggaatatct ttttccatcc    9480
ttttactctg aggtgatatc tatccttgat gttaaagtat gtttcttgga ttcagttaaa    9540
gaatgaatcc tattttttgaa cccaattttt tagtctgtgt cttatttatt gggaaattga    9600
ggccactgat atcagtgttt gttgattcct gttatattat tgttatggcg taggccccttt    9660 cccttttgat ttgctggtct gagattattt attcaggctg aagttttcct tgtagtacct    9720
tctatcaagc tggatttgta gacagaaacc acttaagttt cattttattg tagattgtca    9780
ttctttcttc atctctgtga ttaaatgttt tgctggctat agtagtctgg gctggcatct    9840
gtggtagaat gtctgcccag gacctttgac ttttagagtc tcgattgaag tcaggggtta    9900
ttctaatagg tttgtctgcc gttatatgtt atctggtctt tctctattgt ggcttttggt    9960 attcttttctt tgttctgtac attctgtttt ttgattatta tgtgttgtgg ggaatttatt    10020
tttggcccag tccgtttggt gttctatttg tttcttatac catgataggc acttccttct    10080
ttaggttagg taacttttca tctgtgattt tgttgaaaat attttctgtg cctttgacct    10140
gggtttcttc tccttttgct atccctgtta cttatagatt tttggtgttt tcatagtatc    10200
ctagatttcc tggatgtttt gtgcctggat tttgttttct ttctttttttt gtagatttaa    10260 cattttcttt gactgcagta tccttgtctc ctatcttgtc ctcagtgctt gagactctgt    10320
cttccatttc ttgtatgatt ttggtgaggc ttgcttctaa gatttctgtt ctagttccta    10380 aattttttcat ttccagcttt acctcaattt gggttttctt tagcaattcc atttcctctt    10440
tcatgtgttg aacaattttc ttcatttcat tgcactgttt gtgttttcat taatgggttt    10500
attcatatct tctttaggga ccttgaacat attcataata gctattctga gagccttgtc    10560
ttatgcttcc ctgtattgca tttctcggag cctgctgtgg tagggttgct gggctctagt    10620
ggagacatgt cgttctggct gttactgggt ttttacactg gtgtctaggc gactgggttt    10680
gagaagattg taattctagg tgctgatatc tggtcttgtt tttgttgggg tgatgttcag    10740
ttccttggtt tctgttgccc ccccccctca ggggggtgt ggtaactgga ttggttgcct    10800
ggtagggaat gcttctgaga tcctgccaga accctgccac tggcagtctt gggtagaaag    10860
tgtttctagg tgttgggagc tgacactaat gattgaggat gggttagaag cagtggtggc    10920
```

```
gggagagtcc acaggaggag gagagctggg tgtgccacca gggtctgcac agaggcctgg   10980
gaatgagaac agagatgaag gtgaggcctc agcaggtagt ctgctacaag gttgggataa   11040
ggctgggaga ttggaacttg gggacaggag ggagagtgaa gatcgcagac ccatcccctg   11100
gccaggtggg ggaagcctgg aggagaagat ctgtgtgatc tgctggaaat gggtccctta   11160
gtaacttctt gaagtttctt tgattttgag gctgctgttg ggggtcccct gtatgccaag   11220
catgtggtat atcactgaga tagaatctcc atagccctgc ttcttttttg agactgggtc   11280
tcatatcggc caggttggcc ttgaactagc tatgttgacc ttgaactttt ccttacctat   11340
acctgagaac tgggattaca agtgcccatc acacccagct tcctattgtt tttgcttttt   11400
tcctagtatt taagcttctg gcttccccat taaaatttaa aagatgaaag gcttagtaca   11460
cgggaagcat ccttgaaggt gcacacactt gccatataga gaggatgaag tggttctaag   11520
tcatcaggca gcagcccag gatcagacag ttcacattct ccatcatctg gttcagggga    11580
gccccacctg tactctgaat gttgcctggg aaactgtggg gacacactct tgatatttac   11640
agatgggctg cctctgggaa taaacctggg gaagaataag acttcggagg atgctgctgc   11700
agactatgta gagggtgttc gtgtcctggg cccccttggct gactacctgg tggtgaatgt  11760
gtccagtccc aacactgctg gtctgaggag cctacaggga aaggctgagc tgcgccgcct   11820
gctggccaag gtgtgtcatt acaccatcac atgcctgttg tccttactcc ttttcattct   11880
tcaggtgaag attcaggaca actgaggaga aactgttctt cacagctggc ctaggagccc   11940
tcatcacaca ttttccaagt accctctcat gtctcacagc cccggtcata cacaatagac   12000
agttcactgc tttaaaacca caggcaagca gagcagagca ggcggggctc ccatgtatca   12060
ctctgtcccc agaactgtga atgctcagca cttgtgacac acctccttgt ttgttttcag   12120
gaacaaaatc aaaaccctg agcagttatc tcggcggggg gtgcgggggt gggggaattg    12180
ctggtgcttt agttgacctt aggtgaaaat gctggcctgc actgcggggc tatgggctgg   12240
gtccccatct ctggcttgtc aacctaggtg ctgcaggaga gggacgcttt gaagggagcg   12300
cagaagccag cagtgctggt gaagatcgcc cccgacctca cggcccagga caaggaggac   12360
attgccagtg tggcgagaga ggtttgagtt ggggtggtcc agggcagggt gggggtagcc   12420
ttcatcgtcc actgctgctg ggataacaca gaagggcatg attggtgact tcctctgtgt   12480
gaagtggaca gctggttgat tgtctgtcat tgtatagttc atctggtagc aaacagtgag   12540
tttgaaaatg tgtttggtga gtcttttttct tgcttctgat ctgtcttcat ccagaaagtc   12600
tgaggcctgt gctagtctct gccagtctca cctgggactt agaatggtgt ctgtcccttt   12660
ccagcttgtg taaacaccag gcttctctgg ctaaaaaggt agtaggaaca cagtctgctg   12720
ttctggactt cagtcttgtt ctactgtgta ctccctgaga tactcacaga cagcttgttc   12780
taagggtcaa actctgtgta ggcactgtga tgggttcagc aggagatgct gctgtgtctt   12840
cagcattgag aggctaattc tgatggcttc tccaatcaag atgtaggtga ggcctgtgag   12900
ggtcttgctc tgcagagctg gcccctggcc tggtggctgc ttcaatcctc aaaagacagt   12960
ttccttgagt acttcagatc catggcttaa ggctcttttt ctgtcttgtg ctgcagctgg   13020
gcattgatgg attaattgtc acaaacacca cagtgagtcg cccgactggc ctccaaggtg   13080
ctctgcgttc tgagatggga ggactgagcg ggaagccact ccgagatctg tcgacccaga   13140
ccatccggga gatgtacacc ctcactcaag gtaaggcttt tttgtttgtt tgtttgaggc   13200
aggatttctc tgtttaacac ctctggctgt cctggaactc acttggtaga ccaggctggc   13260
ctggaactca cagcttccct agtgctggga ttaaaggcat gtgccaccat tgcctggcta   13320
```

```
aggcaagact tctttggaca aatgtgaggt cctggatctt ccctcattca ctgtgtttgc    13380
tgagaactct ggttctgccc tcatcggctg tgtttgctgg gactgaggcc tgatggagcc    13440
ctgggtcttt agccctccct tcccggcctt gctatgtgct tctctccagg caggattccc    13500
attatcgggg ttggtggtgt gagcagtggg caagatgcgc tggagaagat ccaggcaggg    13560
gcctccctgg tgcagctgta cacggccctc accttcctgg ggccacccgt cgtggtcagg    13620
gtcaagcgtg agctggaggc acttctaaag tgagtagggt tcgatgcagc tgagacgtag    13680
aaagtgacac ttgtcatcag tctattgtgt actcccagag ggccggaggg aacactgagg    13740
gcatggtggg acgatttctc tgctgcagct ttggccaagg acaaacagtg ccagaggaat    13800
tcagaatgct tctgaggcag ggctcattac aaggcaggac ttgccacttg cccaggggct    13860
gggcatggag gatgaagtag taatttacat tgactcagtg tctggaagct gcaggttata    13920
aagtcacttc ccttcctgca cagaaggcct ggctgtacat atgtgcaggg gcctgggtga    13980
gggcagagta gcagtggttg taaggtgtgt tgggtgggac ggtgtggtaa gcggtgtgct    14040
catggtgagt gtgggcttcc ttaggacagg ctatttgttt tctgtccaga gagcggggtt    14100
ttaacacagt cacagaagcc attggagcag atcatcggag gtgacggttc ctgccagatg    14160
ccccatccag aacgtgccca ccaactcaag caagccttgt ggctgcatca taagaggaag    14220
atctgtctca agctatgtcc cttgactgtg tgacctggct ggactgcata agccagtcac    14280
ggttatcact agacagtaaa ggctttctct aatgagacca tgaactctac agtcactttc    14340
tggatctaag tcctgggatc cctcagtatt ataaggacat tggctctttg ggaggaaaaa    14400
tcatggagaa aataaagcca tttcaatctg ttttcaa                            14437

<210> SEQ ID NO 23
<211> LENGTH: 20
<212> TYPE: DNA
<213> ORGANISM: Artificial Sequence
<220> FEATURE:
<223> OTHER INFORMATION: corresponding piece of DNA for generating gRNA

<400> SEQUENCE: 23
caaggatgat ggctgcatcc                                                 20

<210> SEQ ID NO 24
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence1')

<400> SEQUENCE: 24
ggatgcagcc atcatccttg gtttt                                           25

<210> SEQ ID NO 25
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence1')

<400> SEQUENCE: 25
caaggatgat ggctgcatcc cggtg                                           25

<210> SEQ ID NO 26
```

<211> LENGTH: 395
<212> TYPE: PRT
<213> ORGANISM: Artificial Sequence
<220> FEATURE:
<223> OTHER INFORMATION: amino acid sequence of human DHODH G202A

<400> SEQUENCE: 26

```
Met Ala Trp Arg His Leu Lys Lys Arg Ala Gln Asp Ala Val Ile Ile
1               5                   10                  15
Leu Gly Gly Gly Gly Leu Leu Phe Ala Ser Tyr Leu Met Ala Thr Gly
                20                  25                  30
Asp Glu Arg Phe Tyr Ala Glu His Leu Met Pro Thr Leu Gln Gly Leu
            35                  40                  45
Leu Asp Pro Glu Ser Ala His Arg Leu Ala Val Arg Phe Thr Ser Leu
    50                  55                  60
Gly Leu Leu Pro Arg Ala Arg Phe Gln Asp Ser Asp Met Leu Glu Val
65                  70                  75                  80
Arg Val Leu Gly His Lys Phe Arg Asn Pro Val Gly Ile Ala Ala Gly
                85                  90                  95
Phe Asp Lys His Gly Glu Ala Val Asp Gly Leu Tyr Lys Met Gly Phe
            100                 105                 110
Gly Phe Val Glu Ile Gly Ser Val Thr Pro Lys Pro Gln Glu Gly Asn
        115                 120                 125
Pro Arg Pro Arg Val Phe Arg Leu Pro Glu Asp Gln Ala Val Ile Asn
    130                 135                 140
Arg Tyr Gly Phe Asn Ser His Gly Leu Ser Val Val Glu His Arg Leu
145                 150                 155                 160
Arg Ala Arg Gln Gln Lys Gln Ala Lys Leu Thr Glu Asp Gly Leu Pro
                165                 170                 175
Leu Gly Val Asn Leu Gly Lys Asn Lys Thr Ser Val Asp Ala Ala Glu
            180                 185                 190
Asp Tyr Ala Glu Gly Val Arg Val Leu Ala Pro Leu Ala Asp Tyr Leu
        195                 200                 205
Val Val Asn Val Ser Ser Pro Asn Thr Ala Gly Leu Arg Ser Leu Gln
    210                 215                 220
Gly Lys Ala Glu Leu Arg Arg Leu Leu Thr Lys Val Leu Gln Glu Arg
225                 230                 235                 240
Asp Gly Leu Arg Arg Val His Arg Pro Ala Val Leu Val Lys Ile Ala
                245                 250                 255
Pro Asp Leu Thr Ser Gln Asp Lys Glu Asp Ile Ala Ser Val Val Lys
            260                 265                 270
Glu Leu Gly Ile Asp Gly Leu Ile Val Thr Asn Thr Thr Val Ser Arg
        275                 280                 285
Pro Ala Gly Leu Gln Gly Ala Leu Arg Ser Glu Thr Gly Gly Leu Ser
    290                 295                 300
Gly Lys Pro Leu Arg Asp Leu Ser Thr Gln Thr Ile Arg Glu Met Tyr
305                 310                 315                 320
Ala Leu Thr Gln Gly Arg Val Pro Ile Ile Gly Val Gly Gly Val Ser
                325                 330                 335
Ser Gly Gln Asp Ala Leu Glu Lys Ile Arg Ala Gly Ala Ser Leu Val
            340                 345                 350
Gln Leu Tyr Thr Ala Leu Thr Phe Trp Gly Pro Pro Val Val Gly Lys
        355                 360                 365
Val Lys Arg Glu Leu Glu Ala Leu Leu Lys Glu Gln Gly Phe Gly Gly
    370                 375                 380
```

Val Thr Asp Ala Ile Gly Ala Asp His Arg Arg
385                 390                 395

<210> SEQ ID NO 27
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence2')

<400> SEQUENCE: 27
gatgcagcca tcatccttgg gtttt                                          25

<210> SEQ ID NO 28
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence2')

<400> SEQUENCE: 28
ccaaggatga tggctgcatc cggtg                                          25

<210> SEQ ID NO 29
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence3')

<400> SEQUENCE: 29
gcagccatca tccttggggg gtttt                                          25

<210> SEQ ID NO 30
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence3')

<400> SEQUENCE: 30
cccccaagga tgatggctgc cggtg                                          25

<210> SEQ ID NO 31
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence4')

<400> SEQUENCE: 31
gccatcatcc ttgggggagg gtttt                                          25

<210> SEQ ID NO 32
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence4')

<400> SEQUENCE: 32
cctcccccaa ggatgatggc cggtg                                            25

<210> SEQ ID NO 33
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence5')

<400> SEQUENCE: 33
gctattcgct tcacgtccct gtttt                                            25

<210> SEQ ID NO 34
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence5')

<400> SEQUENCE: 34
agggacgtga agcgaatagc cggtg                                            25

<210> SEQ ID NO 35
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence6')

<400> SEQUENCE: 35
gcctctacaa actgggcttt gtttt                                            25

<210> SEQ ID NO 36
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence6')

<400> SEQUENCE: 36
aaagcccagt ttgtagaggc cggtg                                            25

<210> SEQ ID NO 37
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence7')

<400> SEQUENCE: 37
ggctttgggt ttgtcgaggt gtttt                                            25

<210> SEQ ID NO 38
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence7')

<400> SEQUENCE: 38
acctcgacaa acccaaagcc cggtg                                             25

<210> SEQ ID NO 39
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence8')

<400> SEQUENCE: 39
gctggtctga ggagcctaca gtttt                                             25

<210> SEQ ID NO 40
<211> LENGTH: 25
<212> TYPE: DNA
<213> ORGANISM: Artificial Sequence
<220> FEATURE:
<223> OTHER INFORMATION: oligonucleotide used for obtaining gRNA
      (Sequence8')

<400> SEQUENCE: 40
tgtaggctcc tcagaccagc cggtg                                             25

<210> SEQ ID NO 41
<211> LENGTH: 19
<212> TYPE: DNA
<213> ORGANISM: Artificial Sequence
<220> FEATURE:
<223> OTHER INFORMATION: 603 sense oligonucleotide

<400> SEQUENCE: 41
gttggccttc caatggctt                                                    19

<210> SEQ ID NO 42
<211> LENGTH: 16
<212> TYPE: DNA
<213> ORGANISM: Artificial Sequence
<220> FEATURE:
<223> OTHER INFORMATION: 503 antisense oligonucleotide

<400> SEQUENCE: 42
gttccttcac aaagat                                                       16

<210> SEQ ID NO 43
<211> LENGTH: 21
<212> TYPE: DNA
<213> ORGANISM: Artificial Sequence
<220> FEATURE:
<223> OTHER INFORMATION: Sequence including targeted sequence and PAM

<400> SEQUENCE: 43
ggatgcagcc atcatccttg g                                                 21

<210> SEQ ID NO 44
<211> LENGTH: 40
<212> TYPE: DNA
<213> ORGANISM: Artificial Sequence
<220> FEATURE:
<223> OTHER INFORMATION: Sense DHODH exon2 sequence region including
      CrispR sequence n°1

<400> SEQUENCE: 44
gacgaaacac cgggatgcag ccatcatcct tggtttaga                               40

<210> SEQ ID NO 45

```
<211> LENGTH: 40
<212> TYPE: DNA
<213> ORGANISM: Artificial Sequence
<220> FEATURE:
<223> OTHER INFORMATION: Antisense DHODH exon2 sequence region including
      CrispR sequence n°1

<400> SEQUENCE: 45
tctaaaacca aggatgatgg ctgcatcccg gtgtttcgtc                              40
```